US012585973B1

(12) United States Patent
Krishnan et al.

(10) Patent No.: US 12,585,973 B1
(45) Date of Patent: Mar. 24, 2026

(54) ADAPTIVE CALIBRATION FOR QUANTUM COMPUTING SYSTEMS

(71) Applicant: QpiAI India Private Limited, Nagavara (IN)

(72) Inventors: Aswanth Krishnan, Bengaluru (IN); Lakshya Priyadarshi, Lucknow (IN); Manjunath Ramachandrappa Venkatesh, Bangalore (IN); Nagendra Nagaraja, Bangalore (IN)

(73) Assignee: QpiAI India Private Limited, Bangalore (IN)

( * ) Notice: Subject to any disclaimer, the term of this patent is extended or adjusted under 35 U.S.C. 154(b) by 0 days.

(21) Appl. No.: 19/326,488

(22) Filed: Sep. 11, 2025

(30) Foreign Application Priority Data

Nov. 30, 2024 (IN) .............................. 202441082994

(51) Int. Cl.
G06N 3/04 (2023.01)
G06N 3/0464 (2023.01)
G06N 10/60 (2022.01)

(52) U.S. Cl.
CPC ........... G06N 10/60 (2022.01); G06N 3/0464 (2023.01)

(58) Field of Classification Search
CPC .............................. G06N 3/0464; G06N 10/60
See application file for complete search history.

(56) References Cited

U.S. PATENT DOCUMENTS

2020/0387822 A1* 12/2020 Kilmov ................... G06F 15/82
2023/0029092 A1* 1/2023 Klimov ................ G06N 3/0464
2023/0315516 A1* 10/2023 Fitzpatrick ............. G06N 10/40
                                                                    718/102
2025/0117683 A1* 4/2025 Seif ........................ G06N 10/60

FOREIGN PATENT DOCUMENTS

CN 118095470 A * 5/2024 ............. G06N 3/084

OTHER PUBLICATIONS

Ai, Hao, and Yu-xi Liu. "Scalable parameter design for superconducting quantum circuits with graph neural networks." Physical Review Letters 135.4 (2025): 040601. (Year: 2025).*
Tudisco, Antonio, et al. "Graph Neural Network-Based Predictor for Optimal Quantum Hardware Selection." arXiv preprint arXiv: 2507.19093 (2025). (Year: 2025).*
Saravanan, Vedika, and Samah M. Saeed. "Data-driven reliability models of quantum circuit: From traditional ml to graph neural network." IEEE Transactions on Computer-Aided Design of Integrated Circuits and Systems 42.5 (2022): 1477-1489. (Year: 2022).*

* cited by examiner

*Primary Examiner* — Hal Schnee
(74) *Attorney, Agent, or Firm* — Foley & Lardner LLP

(57) ABSTRACT

Systems and methods for adaptive calibration of quantum computing systems are disclosed. A system can include one or more processors coupled to non-transitory memory and configured to obtain telemetry data from a quantum processor of a quantum computing system, generate a spatio-temporal graph data structure based on the telemetry data and operational parameters, and provide at least a portion of the graph as input to a graph neural network (GNN) to generate parameter ranges for operation. The system can select a first set of test parameters using a Bayesian optimization function, execute calibration experiments to generate calibration results, generate updated operational parameters based on the results, and control the quantum processor according to the updated parameters.

20 Claims, 9 Drawing Sheets

— 500

600

SPATIO-TEMPORAL GRAPH 170

AGGREGATION PROCESS 602

TEMPORAL PROCESSING 614

MESSAGE PASSING 604

NODE/EDGE FEATURE UPDATE 605

READOUT FEATURE UPDATE 606

DEVICE-SPECIFIC PARAMETERS 616

DEVICE PARAMETER UPDATE 608

GLOBAL FEATURE UPDATE 610

GLOBAL FEATURES 618

GRAPH-LEVEL POOLING 612

ADAPTIVE CALIBRATION FOR QUANTUM COMPUTING SYSTEMS

CROSS-REFERENCES TO RELATED APPLICATIONS

This application claims the benefit of and priority to Indian Provisional Patent Application No. 202441082994, filed Nov. 30, 2024, the contents of which is incorporated herein by reference in its entirety for all purposes.

BACKGROUND

Quantum computing systems employ specialized hardware and software to manipulate and measure quantum bits for computational tasks. Superconducting quantum circuits require precise calibration of control parameters such as drive, flux, and readout lines to operate correctly. Maintaining calibration in large-scale quantum processors remains challenging due to high-dimensional calibration spaces, spatial crosstalk effects, and dynamic parameter drift over time.

SUMMARY

Quantum computing architectures that employ superconducting quantum circuits require frequent calibration of qubit drive, flux bias, and readout line parameters to maintain operational fidelity. Conventional calibration approaches, which often rely on manual routines or exhaustive parameter sweeps, can demand significant measurement resources and time, particularly as the number of qubits increases. High-dimensional parameter spaces, spatial crosstalk between qubits, and temporal drift in device characteristics can further limit the effectiveness of such approaches, as independent tuning of parameters may fail to account for interdependencies or dynamic changes in system performance.

The techniques described herein can provide an adaptive calibration process that leverages a spatio-temporal Graph Neural Network (GNN) in conjunction with probabilistic optimization and automated monitoring. A spatio-temporal GNN can process quantum processor data—including qubit parameters, device topology, coupling strengths, and measurement history—across both spatial and temporal dimensions to estimate calibration parameter ranges and associated uncertainties. A Bayesian optimization module can refine such estimates by selecting parameter values for experimental evaluation, while a continuous monitoring process can trigger calibration cycles in response to detected performance degradation. In some implementations, periodic retraining of the GNN using accumulated calibration data can further adapt the calibration process to evolving device conditions.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of "a," "an," and "the" include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
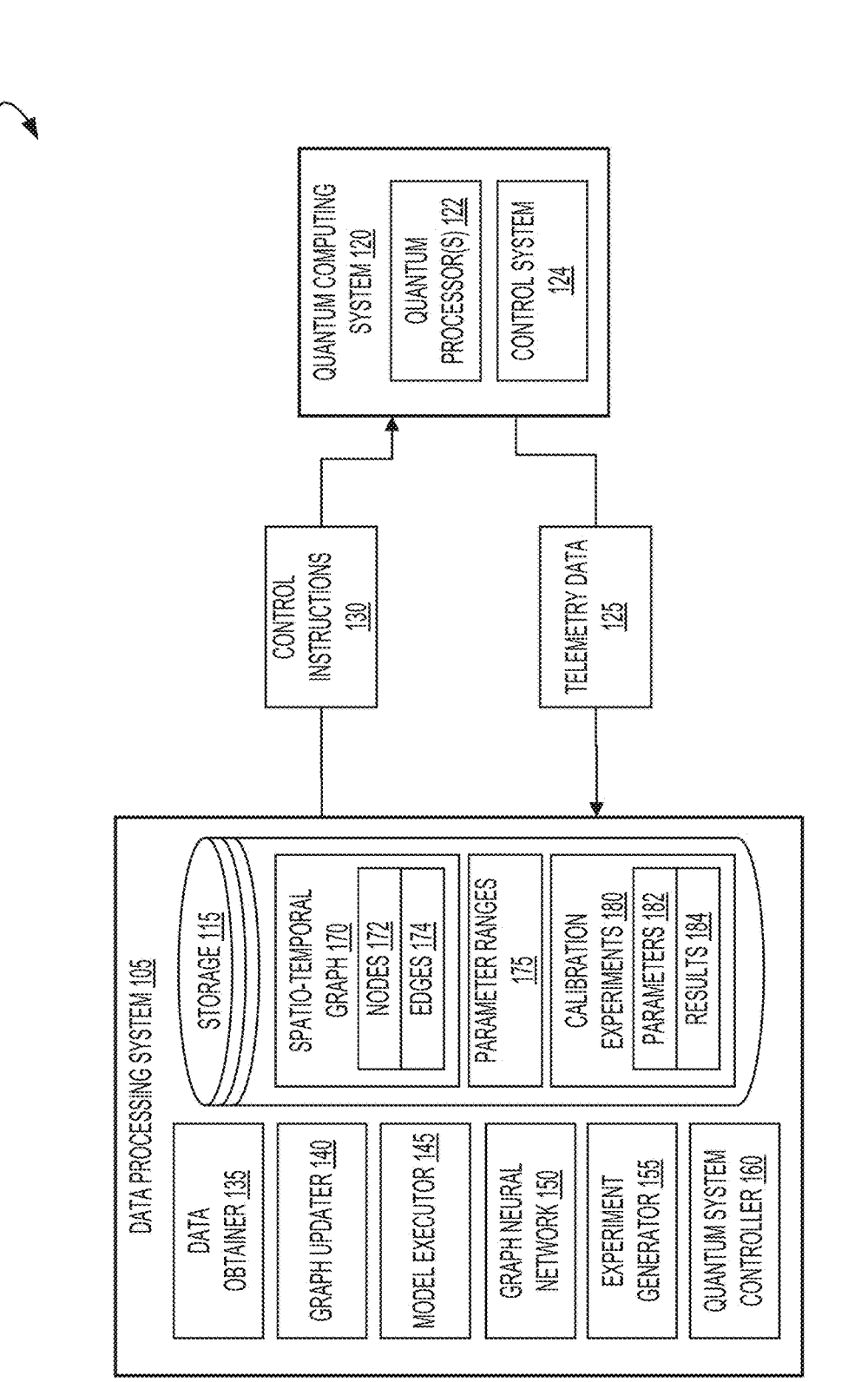
FIG. 1 is a block diagram illustrating a high-level overview of an adaptive calibration system for a quantum computing system, in accordance with one or more implementations.

Below are detailed descriptions of various concepts related to, and approaches, methods, apparatuses, and systems for implementing the various techniques described herein. The various concepts introduced above and discussed in greater detail below may be implemented in any of numerous ways, as the described concepts are not limited to any particular manner of implementation. Examples of specific implementations and applications are provided primarily for illustrative purposes.

Quantum computing systems can use quantum circuits to perform computational operations by manipulating quantum bits. Such systems can include a quantum processor that is connected to various control and measurement components.

For example, the quantum processor can use drive lines, flux bias lines, and readout lines to control and measure the state of individual qubits. In many implementations, the quantum processor can be integrated with classical computing systems/resources that can coordinate control signals, acquire measurement data, and execute calibration routines.

Several technical challenges are encountered when using existing approaches for calibrating quantum circuits. As the number of qubits in a quantum processor increases, the number of calibration parameters grows in kind, resulting in a high-dimensional parameter space that must be calibrated for the quantum processor to operate correctly. Conventional calibration techniques require manual/heuristic intervention to perform calibration of such systems, which are typically time-consuming, imprecise, and often do not result in an optimal calibrated state. Moreover, spatial coupling between qubits in modern quantum systems introduce dependencies between calibration parameters that are not addressed during independent tuning, resulting in additional difficulty in calibrating such systems.

The techniques described herein address the technical challenges associated with superconducting quantum circuits by using an automatic process for obtaining measurement data from the quantum processor, generating parameter estimates using a spatio-temporal machine learning model, refining/optimizing calibration values through probabilistic optimization, and applying derived calibration settings to hardware controllers. The techniques described herein provide a data-driven approach to calibration that can adapt to changes in device characteristics and operational conditions. Moreover, such approaches can execute automatically according to detected changes in parameters over time, for example, when operational parameters drift or no longer result in a calibrated state.

To implement the techniques described herein, the quantum processor and the attributes thereof can be represented as a graph that encodes both the spatial layout of qubits and the temporal evolution of calibration parameters. A spatio-temporal graph neural network (GNN) can be used to process the graph representation and generate initial estimates for calibration parameters, uncertainty values, and control pulse shapes. Bayesian optimization can be used to select parameter values for experimental evaluation, for example, using a probabilistic model to balance information gain and performance objectives. Various calibration experiments can be selected/generated for execution via the quantum processor, the results of which can be used to iteratively update the graph and refine the calibration parameters of the quantum processor. In some implementations, the GNN can be periodically retrained using accumulated calibration data to improve the accuracy of future parameter estimation.

By using the techniques described herein, the techniques described can reduce the number of calibration experiments implemented to achieve target performance metrics. The present techniques can be used to adapt calibration processes to the specific architecture and operational history of specific quantum processors. The systems and methods described herein can provide improved calibration accuracy and efficiency by using machine learning to generate parameter estimates and by using probabilistic optimization to select high-value experiments, in contrast to manual/heuristic approaches to calibrating such systems.

Referring now to FIG. 1, illustrated is a block diagram of an adaptive calibration system 100 for a quantum computing system, in accordance with one or more implementations. The adaptive calibration system 100 can include a data processing system 105 and a quantum computing system 120. The data processing system 105 can include storage 115, a data obtainer 135, a graph updater 140, a model executor 145, a graph neural network 150, an experiment generator 155, and a quantum system controller 160. The storage 115 can include a spatio-temporal graph 170, nodes 172, edges 174, parameter ranges 175, calibration experiments 180, parameters 182, and results 184. The quantum computing system 120 can include quantum processor(s) 122 and a control system 124.

The data processing system 105 can include at least one processor and a memory (e.g., a processing circuit). The memory can store processor-executable instructions that, when executed by processor(s), cause the processor(s) to perform one or more of the operations described herein. The processor(s) may include a general-purpose processor (e.g., a central processing unit (CPU), etc.), an application-specific integrated circuit (ASIC), a graphics processing unit (GPU), a tensor processing unit (TPU), a field-programmable gate array (FPGA), the like, or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, and/or any other suitable memory from which the processor(s) can read instructions and/or data. The instructions may include code from any suitable computer programming language. The data processing system 105 can include one or more computing devices or servers that can perform various functions as described herein. The data processing system 105 can include any or all of the components and perform any or all of the functions of any computing system described herein.

The quantum computing system 120 includes at least one quantum processor 122 and a control system 124, with these components either co-located within a shared enclosure or interconnected through a dedicated interface to support integrated operation. The quantum processor(s) 122 may include hardware elements such as qubits, resonators, couplers, and associated wiring, and may include superconducting materials that can be used to perform quantum operations. Physical and electrical connections between the quantum processor(s) 122 and the control system 124 may include signal lines for control and readout, power delivery lines, and grounding arrangements, with the system optionally utilizing shielded cabling or cryogenic-compatible connectors to maintain signal integrity and compatibility with low-temperature environments. The control system 124 may incorporate classical electronic components, including waveform generators, analog-to-digital converters, digital-to-analog converters, timing circuitry, and microcontrollers, with these components arranged to generate, transmit, and receive signals to and from the quantum processor(s) 122. The quantum computing system 120 may further include thermal management features, such as cryostats, heat sinks, or thermal shielding, to maintain operational temperatures suitable for superconducting qubits. In some implementations, the quantum computing system 120 assembly may be mounted within a dilution refrigerator or similar apparatus to achieve the required cryogenic conditions. The quantum computing system 120 may execute quantum operations and respond to control instructions received from external data processing systems.

The quantum computing system 120 may include a housing or enclosure. The enclosure or mounting apparatus may provide electromagnetic shielding and vibration isolation to minimize environmental disturbances that could impact quantum coherence. Signal routing within the system may be organized to minimize crosstalk and electromagnetic interference, with dedicated pathways for each control and readout channel. The system may include diagnostic ports or test points to facilitate maintenance, troubleshooting, or performance verification. Power supplies and grounding networks may be engineered to support stable operation across a range of cryogenic and room-temperature conditions. The quantum computing system 120 and/or control systems 124 thereof may include communication interfaces to communicate with the data processing system 105 and/or the components thereof.

The quantum processor(s) 122 can function as the hardware subsystem responsible for executing quantum logic gates, state preparation, measurement, and other quantum operations, with these operations realized through the application of microwave, flux, or voltage pulses to the qubits. The quantum processor(s) 122 may receive operational parameters such as pulse amplitude, frequency, phase, duration, and bias points, with these parameters determined by the data processing system 105 in accordance with calibration routines or computational requirements. The quantum processor(s) 122 may include on-chip or off-chip circuitry for routing control signals to individual qubits or groups of qubits, and may support either parallel or sequential execution of quantum operations depending on the system architecture. Updated operational parameters may be received by the quantum processor(s) 122 via digital or analog signal interfaces, with parameter updates occurring in real time or according to a scheduled calibration cycle as dictated by system requirements. Measurement outputs, such as qubit state readouts, may be generated by the quantum processor(s) 122 and transmitted back to the data processing system 105 for further processing or feedback into calibration algorithms. The quantum processor(s) 122 may operate in coordination with the control system 124 to implement quantum algorithms and calibration procedures.

The quantum processor(s) 122 may be fabricated using processes that support integration of superconducting qubits, resonators, and couplers on a single chip or across multiple interconnected chips. The processor(s) may include structures for minimizing decoherence and crosstalk, such as ground planes, shielding layers, or dedicated isolation regions. Control and measurement circuitry may be arranged to support high-fidelity gate operations and rapid state readout, with timing and synchronization managed by the control system 124. The quantum processor(s) 122 may include calibration structures or test devices to support in situ characterization and tuning of device parameters. The architecture may be designed to support scalability, enabling the addition of further qubits or couplers as required for larger computational tasks. The quantum processor(s) 122 may be configured to operate within a range of cryogenic temperatures, with performance monitored and adjusted according to environmental and operational feedback.

The control system 124 may be implemented as a hardware and/or firmware assembly configured to receive digital or analog control instructions 130 from the data processing system 105, with such instructions potentially including timing information, waveform definitions, and parameter values for quantum operations. The control system 124 may include signal generation hardware, pulse modulators, multiplexers, demultiplexers, and synchronization circuitry, which are arranged to convert received instructions into physical signals that are applied to the quantum processor(s) 122. Control instructions 130 may be buffered, sequenced, or queued by the control system 124 to ensure correct temporal alignment and to avoid signal collisions, and the system may provide feedback to the data processing system 105 regarding the execution status of each instruction.

The control system 124 may support error detection or correction features, such as monitoring for out-of-range parameters or signal integrity issues, and may initiate safe-state procedures and/or transmit messages to the data processing system 105 if operational anomalies are detected during operation. Interfaces between the control system 124 and the quantum processor(s) 122 may include various types of signal lines (e.g., microwave, DC bias, and readout lines), with isolation or filtering elements included as needed to maintain signal fidelity and suppress noise. The control system 124 can be used to control the quantum processor(s) 122 to execute quantum operations as directed by the data processing system 105 or other computing systems/control instructions 130. The control system 124 can be used to facilitate signal conditioning and amplification, such that control pulses delivered to the quantum processor(s) 122 meet required amplitude, phase, and timing specifications. The quantum computing system 120 may be implemented, for example, using the quantum system 902 described in connection with FIG. 9.

The data processing system 105 can include or be in communication with the storage 115. The storage 115 can be a computer-readable memory that can store or maintain any of the information described herein. The storage 115 can maintain one or more data structures, which may contain, index, or otherwise store each of the values, pluralities, sets, variables, vectors, numbers, or thresholds described herein. The storage 115 can be accessed using one or more memory addresses, index values, or identifiers of any item, structure, or region maintained in the storage 115. The storage 115 can be accessed by the components of the data processing system 105, or any other computing device described herein. In some implementations, the storage 115 can be internal to the data processing system 105. In some implementations, the storage 115 can exist external to the data processing system 105 and may be accessed via a network. For example, the storage 115 may be distributed across many different computer systems (e.g., a cloud computing system) or storage elements and may be accessed via the network or a suitable computer bus interface.

The data processing system 105 can store, in one or more regions of the memory of the data processing system 105, or in the storage 115, the results of any or all computations, determinations, selections, identifications, generations, constructions, or calculations in one or more data structures indexed or identified with appropriate values. Any or all values stored in the storage 115 may be accessed by any computing device described herein, such as the data processing system 105, to perform any of the functionalities or functions described herein. In implementations where the storage 115 forms a part of a cloud computing system, the storage 115 can be a distributed storage medium in a cloud computing system and can be accessed by any of the components of the data processing system 105 or any other computing devices described herein.

The spatio-temporal graph 170 can represent the quantum processor(s) 122 and operational parameters across spatial and temporal dimensions. The spatio-temporal graph 170 can include nodes 172 and edges 174. The spatio-temporal graph 170 can be a data structure that encodes both the physical topology of the quantum processor(s) 122 and the changes of operational parameters over time. The nodes 172 can represent individual qubits of the quantum processor(s) 122, and each node 172 may include attributes or feature vectors that describe properties of the associated qubit as described in further detail herein. Such attributes can include qubit frequency, coherence time, fabrication parameters, or other device-specific characteristics, among others. The edges 174 can represent relationships between nodes 172, such as static couplings, crosstalk, and/or other inter-qubit dependencies, and some edges 174 may encode temporal relationships by connecting instances of the same node 172 at different time indices. The spatio-temporal graph 170 can represent both spatial connections between qubits and the time-evolving nature of calibration parameters, thereby representation of parameter drift or other dynamic changes in any of the attributes described herein.

The spatio-temporal graph 170 can be generated and updated based on telemetry data 125 and operational parameters, and the spatio-temporal graph 170 may be updated in response to new measurement data or calibration cycles. The generation or update process, which is described in further detail herein, can include extracting qubit and device attributes from telemetry data 125, assigning each attribute to the appropriate node 172, and establishing edges 174 based on measured or specified relationships among qubits. In some implementations, the spatio-temporal graph 170 may include temporal edges that connect multiple instances of a node 172 to capture sequential parameter states across calibration cycles. The spatio-temporal graph 170 may be stored within storage 115 using a format or schema such as adjacency lists, matrices, or serialized graph objects, among other formats. The spatio-temporal graph 170 can be input to the graph neural network 150 for calibration parameter estimation and may be used by other components for analysis or visualization. In some implementations, the spatio-temporal graph 170 may be accessed by additional components of the data processing system 105 to facilitate experiment scheduling, performance tracking, or visualization of calibration history.

Each node 172 in the spatio-temporal graph 170 can uniquely identify a qubit within the quantum processor(s) 122. The node 172 can include attributes or data fields that represent operational parameters such as frequency, bias, or error rates, and static properties such as qubit type or fabrication details. The node identifier can be assigned based on a unique qubit label or hardware address, and the indexing or keying scheme can use a mapping table or hash function to reference each node 172 within the spatio-temporal graph 170. The node 172 data can be created during initial graph construction, and the data can be updated in response to new telemetry data 125 or calibration results 184. In some implementations, node 172 data can be associated with timestamps or identifiers to maintain a historical record of parameter changes. The node 172 can be associated with parameter ranges 175 or calibration experiments 180 for downstream calibration and optimization processes.

The attributes of each node 172 can include both dynamic and static features that characterize the corresponding qubit in the quantum processor(s) 122. The operational parameters can include values such as frequency, bias, or error rates, which can change over time (as represented by additional temporal nodes 172 in the spatio-temporal graph 170) as additional telemetry data 125 and/or calibration results 184 are received. The static properties can include qubit type (e.g., transmon, flux qubit), and fabrication details such as process node and/or material composition. The node 172 can be referenced by a unique identifier within the spatio-temporal graph 170. In some implementations, the node 172 can store links or pointers to related data structures such as parameter ranges 175 and/or calibration experiments 180. The lifecycle of node 172 data can include creation, update, archival, or deletion based on operational requirements and data retention policies.

Non-limiting examples of node 172 features can include qubit frequency, which can specify the resonance frequency of the qubit, and anharmonicity, which can indicate the energy level spacing nonlinearity. The node 172 can store T1 and T2 times, which can represent the energy relaxation time and the dephasing time, respectively. The readout fidelity can quantify the accuracy of qubit state measurement, and the gate error rates can indicate the probability of error during gate operations. The node 172 can include flux bias and drive amplitude values, which can define the control settings applied to the qubit during operation or calibration.

In some implementations, one or more nodes 172 can correspond to readout resonators associated with the respective qubits of the quantum processor(s) 122. Each node 172 corresponding to a readout resonator can include attributes that specify features such as resonator frequency, quality factor, dispersive shift, readout pulse shape, or readout duration, among others. The resonator frequency attribute can indicate the resonance frequency of the readout resonator coupled to a particular qubit, and the quality factor attribute can quantify the energy loss characteristics of the resonator. The dispersive shift attribute can specify the frequency shift experienced by the readout resonator due to the qubit state, and the readout pulse shape attribute can define the temporal profile of the control pulse used for state measurement. The readout duration attribute can represent the time interval over which the readout pulse is applied to acquire measurement data from the qubit. Each node 172 corresponding to a readout resonator can store these attributes as part of its feature vector, enabling the spatio-temporal graph 170 to encode both qubit and readout resonator-specific operational parameters for calibration and optimization processes.

In some implementations, the graph updater 140 can generate nodes 172 corresponding to readout resonators by extracting readout resonator features from telemetry data 125 or device configuration files. The graph updater 140 can assign each readout resonator node 172 a unique identifier and associate it with the corresponding qubit node 172 through one or more edges 174, reflecting the physical or logical relationship between the qubit and its readout resonator. The storage format for readout resonator nodes 172 can include structured records or attribute vectors that store resonator frequency, quality factor, dispersive shift, readout pulse shape, and readout duration values. The readout resonator nodes 172 can be indexed within the spatio-temporal graph 170 to facilitate efficient retrieval and update operations during calibration cycles. In some implementations, the readout resonator features stored in nodes 172 can be used by the graph neural network 150 to estimate calibration parameters or to inform experiment generation by the experiment generator 155. The inclusion of readout resonator-specific nodes 172 and attributes can enable the adaptive calibration system 100 to account for both qubit and readout resonator performance characteristics during calibration and optimization routines.

The edges 174 can correspond to relationships between nodes 172. The edges 174 can represent physical or logical relationships between pairs of nodes 172, such as coupling strength, crosstalk, or shared control lines, among others. Each edge 174 can include attributes or data fields that specify metrics for coupling, error propagation, or time-based dependencies. In some implementations, temporal edges 174 may connect instances of the same node 172 at different time indices to encode changes in qubit parameters over time. The edges 174 can be created, updated, or deleted in response to changes in device configuration or new telemetry data 125. The storage format for edges 174 within the spatio-temporal graph 170 can include edge lists, matrices, or attribute tables.

In some implementations, the edges 174 can encode both static and dynamic relationships between nodes 172. The creation of edges 174 can occur during initial graph construction based on device topology or measurement data, and updates can be triggered by subsequent calibration cycles or operational events. Deletion of edges 174 can occur when a physical or logical relationship between nodes 172 is no longer present due to hardware reconfiguration or device failure. Temporal edges 174 can be generated to connect sequential instances of a node 172, allowing the spatio-temporal graph 170 to represent parameter drift or other time-dependent effects. The edges 174 can be indexed or accessed using unique identifiers that associate each edge 174 with the corresponding pair of nodes 172 and, in the case of temporal edges 174, with specific time indices. The storage of edges 174 can facilitate efficient retrieval and update operations during calibration and optimization processes.

Examples of edge features that can be associated with each edge 174 include coupling strength, inter-qubit distance, crosstalk coefficient, two-qubit gate fidelity, resonance frequency, or coupling tunability, among others. The coupling strength can quantify the interaction magnitude between two qubits represented by nodes 172. The inter-qubit distance can specify the physical separation between qubits, which may affect coupling or crosstalk. The crosstalk coefficient can indicate the extent to which control or measurement signals applied to one qubit influence another qubit. The two-qubit gate fidelity can represent the accuracy of gate operations performed between a pair of qubits. The resonance frequency and coupling tunability can provide additional metrics for characterizing the dynamic behavior of the quantum processor as represented by the edges 174.

In some implementations, edges 174 between qubit nodes 172 and readout resonator nodes 172 in the spatio-temporal graph 170 can represent physical or logical relationships such as coupling, dispersive interaction, or signal routing between the respective qubit and its associated readout resonator. Each edge 174 connecting a qubit node 172 to a readout resonator node 172 can include attributes that specify coupling strength, dispersive shift, readout assignment fidelity, or signal attenuation, among others. For example, the coupling strength attribute can quantify the magnitude of the interaction between a qubit and its readout resonator, while the dispersive shift attribute can indicate the frequency shift of the resonator mode induced by the qubit state. The readout assignment fidelity attribute can represent the probability of correctly distinguishing qubit states during measurement, and the signal attenuation attribute can specify loss factors along the readout line. In some implementations, the edge 174 can further include time-indexed attributes that capture changes in coupling or measurement performance across calibration cycles. The data format for each edge 174 can include a structured record or attribute vector storing the relevant metrics, and each edge 174 can be indexed by the identifiers of the connected qubit node 172 and readout resonator node 172, as well as by a time index when temporal information is present.

The parameter ranges 175 can represent ranges for operational parameters for the quantum processor(s) 122. The parameter ranges 175 can be generated at least in part by the graph neural network 150. The parameter ranges 175 can be data structures that define permissible and/or estimated intervals for operational parameters of the quantum processor(s) 122. The parameter ranges 175 can include intervals for drive amplitude, drive frequency, flux bias, coupler bias, readout frequency, readout pulse amplitude, readout pulse duration, and/or other qubit or resonator control parameters. Each parameter range in the parameter ranges 175 can be represented using a data format that specifies minimum and maximum values, confidence intervals, or probability distributions for the corresponding operational parameter. In some implementations, the parameter ranges 175 can further include uncertainty estimates or weights associated with each interval, which can be determined based on the output of the graph neural network 150. In some implementations, the graph neural network 150 can generate the parameter ranges 175 by processing input from the spatio-temporal graph 170, which can encode both the spatial topology and temporal changes of the quantum processor(s) 122.

The parameter ranges 175 can be stored, indexed, and/or updated within storage 115 using a data schema that associates each parameter range with a unique identifier, a node 172, and/or a calibration experiment 180. In some implementations, the parameter ranges 175 can be indexed by/accessed using a qubit identifier, a node 172 identifier, parameter type, and/or time index/value. The parameter ranges 175 can be updated in response to new measurement data, calibration results, or retraining of the graph neural network 150. The parameter ranges 175 can be accessed by downstream components such as the experiment generator 155 to select candidate parameter values for calibration experiments or by the quantum system controller 160 for calibration control. The parameter ranges 175 can serve as input constraints for Bayesian optimization processes and can inform the scheduling or prioritization of calibration tasks. In some implementations, the parameter ranges 175 can be archived or versioned to maintain a historical record of calibration intervals and associated outcomes.

The calibration experiments 180 can include parameters 182 and results 184, with each calibration experiment 180 storing a set of parameters 182 that specify the operational settings to be applied to the quantum processor(s) 122 during the experiment and a set of results 184 that record the measured outcomes after execution. The calibration experiments 180 can be data records that represent individual or grouped instructions to execute calibration runs on the quantum processor(s) 122, and can include metadata such as experiment type, scheduling priority, and associated device identifiers. Each calibration experiment 180 can include a reference/association to the test parameters 182, which may specify values such as drive amplitude, flux bias, readout frequency, or pulse shape, and, if the calibration experiment 180 has been executed, a reference to the results 184, which may include fidelity metrics, error rates, or parameter drift values.

The calibration experiments 180 can be created during experiment scheduling by the experiment generator 155, updated following execution and measurement by the quantum system controller 160, and stored within storage 115 as structured records that allow for efficient retrieval and update. The calibration experiments 180 can be indexed or keyed by experiment identifier, timestamp, associated quantum computing system, parameter set, or performance metric to facilitate retrieval and historical tracking with other calibration data. The calibration experiments 180 can be accessed in relation to parameter ranges 175 or telemetry data 125 to inform calibration state, performance assessment, or experiment selection for subsequent calibration cycles. In some implementations, the calibration experiments 180 can be updated to reflect new measurement outcomes, revised parameter associations, and/or additional metadata as further data is collected during operation, as described herein. In some implementations, the calibration experiments 180 can be stored in a format that enables efficient access, update, and correlation with other operational data, such as parameter ranges 175, telemetry data 125, or experiment scheduling records.

For example, a calibration experiment 180 including a qubit frequency spectroscopy experiment can include selecting a sweep range centered around the last known resonance frequency of a target qubit, applying a microwave drive pulse at each trial frequency within the range, measuring the qubit state immediately after each drive, and collecting excitation probability data as a function of drive frequency. A calibration experiment 180 including a qubit frequency spectroscopy experiment can generate an output spectroscopy curve that identifies the frequency at which the excitation probability is maximized, thereby determining the qubit's resonance frequency. In some implementations, a calibration experiment 180 including an anharmonicity measurement can include fixing a first drive tone at the qubit's $|0\rangle$ to $|1\rangle$ transition frequency to prepare the qubit in the $|1\rangle$ state, sweeping a second probe tone across the expected $|1\rangle$ to $|2\rangle$ transition range, and measuring whether the qubit population leaks into the $|2\rangle$ state at each probe frequency, thereby determining the frequency separation between the two transitions. A calibration experiment 180 including a qubit relaxation time (T1) measurement can include preparing the qubit in the $|1\rangle$ state using a calibrated π-pulse, waiting for a series of delay times, measuring the qubit state after each delay, and recording the excited state probability as a function of the delay, which can generate an exponential decay curve for extracting the T1 parameter. A calibration experiment 180 including a qubit dephasing time (T2) measurement can include applying a π/2 pulse to create a superposition, waiting for varying delays, applying a second π/2 pulse, measuring the qubit state, and recording the resulting interference pattern as a function of delay to extract the T2* or T2 parameter using Ramsey or spin-echo sequences.

A calibration experiment 180 including a flux crosstalk characterization experiment can include sweeping the flux bias of a target qubit across a defined range, simultaneously measuring the resonance frequencies of neighboring qubits, and fitting the relationship between the target flux changes and the frequency shifts observed in the neighbors to generate crosstalk matrix entries. In some implementations, a calibration experiment 180 including a coupling strength measurement can include preparing one qubit in the $|1\rangle$ state and a neighboring qubit in the $|0\rangle$ state, allowing the system to evolve for varying times under the coupling Hamiltonian, measuring the population of the target qubit at each evolution time, and extracting the oscillation frequency in the population to determine the coupling strength. A calibration experiment 180 including a readout resonator frequency scan can include applying a probe tone near the resonator's expected frequency, sweeping the probe frequency across a range, measuring the transmitted or reflected amplitude or phase for each frequency, and generating a resonator frequency response curve.

A calibration experiment 180 including a readout discrimination experiment can include preparing the qubit in the $|0\rangle$ state, applying a readout pulse and recording the measurement coordinates in the IQ-plane, repeating the process for the $|1\rangle$ state, and outputting the resulting IQ distributions and a separation metric such as state fidelity. In some implementations, a calibration experiment 180 including a Rabi oscillation experiment can include applying resonant drive pulses to the qubit with varying pulse durations or amplitudes, measuring the excited state probability for each parameter setting, and generating an oscillation curve of excitation probability versus drive parameter. A calibration experiment 180 including a two-qubit gate parameter scan can include applying a two-qubit interaction pulse such as a cross-resonance pulse with varying amplitudes or durations, recording joint measurement statistics of the two qubits after the gate, and outputting the dependence of correlation metrics such as parity oscillations on the control parameters. Other types of calibration experiments 180 may also be implemented, and are not necessarily limited to those described herein. Moreover, in some implementations, suitable calibration experiments 180 may include combinations of the various example experiments described herein.

The parameters 182 can include test parameters selected for calibration experiments 180. The parameters 182 can be data fields or vectors that specify the operational settings applied during a calibration experiment 180. The parameters 182 can include, for example, a pulse amplitude value, a pulse frequency value, a flux bias point, a coupler bias value, a readout pulse duration, or a readout resonator frequency, among others. In some implementations, a calibration experiment 180 that measures qubit frequency can include a parameter 182 specifying a sweep range of drive frequencies centered on a nominal qubit frequency value. In some implementations, a calibration experiment 180 that measures qubit relaxation time can include a parameter 182 specifying a set of delay times following a π-pulse excitation. In some implementations, a calibration experiment 180 that measures readout fidelity can include a parameter 182 specifying a readout pulse amplitude and a readout integration window duration.

The parameters 182 can be stored as structured records, vectors, key-value pairs, and/or any other suitable data structure within storage 115, with each set of parameters 182 associated with a specific calibration experiment 180. In some implementations, each parameter 182 can be indexed by a corresponding identifier, a calibration experiment 180 identifier, a parameter type, and/or a timestamp. The parameters 182 associated with a given calibration experiment 180 can be based on parameter ranges 175 generated by the graph neural network 150 and refined through a Bayesian optimization process that incorporates uncertainty estimates and performance metrics, as described in further detail herein. In some implementations, and as described in further detail herein, the experiment generator 155 can update the of parameters 182 in response to results 184 from completed calibration experiments 180, such as by narrowing the frequency sweep range or adjusting the amplitude step size, among other operations.

The parameters 182 can be accessed by the quantum system controller 160 for execution of the corresponding calibration experiment 180. In some implementations, the experiment generator 155 can generate an initial set of parameters 182 based on the output of the graph neural network 150 and the current operational state of the quantum processor(s) 122. As calibration experiments 180 are executed and results 184 are obtained, the parameters 182 can be updated to reflect updated parameter ranges 175, as described herein. The parameters 182 can be stored in association with the corresponding calibration experiment 180 within storage 115, allowing for efficient retrieval and traceability. In some implementations, parameters 182 that are no longer relevant to current calibration cycles can be archived/stored/logged for future reference or removed/deleted.

The results 184 can include calibration results generated from running one or more calibration experiments 180 on the quantum system. The results 184 can be data records that capture the measured outcomes of calibration experiments 180 performed on the quantum processor(s) 122. The results 184 can include, for example, fidelity metrics such as single-qubit gate fidelity values expressed as floating-point percentages, error rates such as bit-flip or phase-flip error probabilities expressed as decimal values, or parameter drift values such as measured frequency shifts in megahertz or bias voltage changes in millivolts. In some implementations, the results 184 can further include qubit relaxation times (T1) measured in microseconds, qubit dephasing times (T2) measured in microseconds, readout assignment fidelities expressed as probability values, or coupling strengths measured in megahertz, among others.

For example, a calibration experiment 180 that performs a qubit frequency spectroscopy sweep can generate a result 184 indicating the resonance frequency at which excitation probability is maximized, while a calibration experiment 180 that measures readout discrimination can generate a result 184 comprising IQ-plane cluster centroids and a state assignment fidelity value. The results 184 can be generated by the quantum system controller 160 upon completion of each calibration experiment 180, stored as structured records or attribute vectors within storage 115, and indexed by experiment identifier, qubit identifier, parameter type, or timestamp to facilitate association with the corresponding calibration experiment 180. The results 184 can be associated with the calibration experiments 180 by storing a reference to the experiment parameters 182 and the measured outcome values within a single data structure. In some implementations, the results 184 can include additional metadata such as experiment type, scheduling priority, or device configuration state at the time of measurement.

The results 184 can be used to update other data structures, such as parameter ranges 175 or the spatio-temporal graph 170 as described herein, by providing measurement outcomes that inform the refinement of operational intervals or the adjustment of node 172 and edge 174 attributes. For example, a result 184 from a flux crosstalk characterization experiment can be used to update the crosstalk coefficient attributes of edges 174 in the spatio-temporal graph 170, while a result 184 from a two-qubit gate parameter scan can be used to refine the parameter ranges 175 for gate amplitude or duration. Such updates may be stored as an additional set of nodes 172 and edges 174 in the spatio-temporal graph, connected to corresponding nodes 172 of a prior timestep using temporal edges 174, as described in further detail herein.

The results 184 can be accessed by any of the components of the data processing system 105. In some implementations, the results 184 can be timestamped to maintain a historical record of calibration outcomes across multiple calibration experiments 180. In some implementations, the results 184 can be updated to include post-processing outcomes, such as fitted decay constants from relaxation time measurements or extracted oscillation frequencies from coupling strength experiments. In some implementations, results 184 that are determined to be outliers or invalid due to experiment failure (e.g., due to errors/faults indicated from the control system 124, communication failures with the quantum computing system 120, etc.) can be flagged and excluded from subsequent processing. The results 184 can be indexed using corresponding identifiers that can be associated with the corresponding calibration experiment 180 and associated quantum processor(s) 122.

Referring now to the operations of the data processing system 105, the data processing system 105 can execute various operations to automatically calibrate one or more quantum computing systems 120 and/or quantum processor(s) 122 thereof. The data processing system 105 can initiate the calibration process in response to a request received from an external computing system, such as a supervisory management platform or a remote client device. In some implementations, the data processing system 105 can begin calibration upon receipt of operator input provided through a user interface or a command-line terminal. The data processing system 105 can trigger calibration automatically when performance degradation is detected by a monitoring process, for example, by comparing measured operational parameters to reference values and determining that a deviation exceeds a predefined threshold, as described in connection with FIG. 5. In some implementations, the data processing system 105 can initiate calibration according to a predetermined schedule, such as periodic intervals specified in system configuration data or maintenance policies. In some implementations, the data processing system 105 can further initiate calibration in response to system events, such as hardware faults, communication errors, or environmental changes detected by telemetry data 125 acquisition.

The data obtainer 135 can obtain telemetry data 125 from the quantum processor(s) 122, the control system 124, and/or other components of the quantum computing system 120. The data obtainer 135 can include hardware, software, or combinations thereof that can retrieve telemetry data 125 from the quantum processor(s) 122, the control system 124, and/or other components of the quantum computing system 120. The data obtainer 135 can obtain telemetry data 125 either continuously, at scheduled intervals, and/or during execution of calibration experiments, for example, by polling the quantum processor(s) 122, the control system 124, and/or other components of the quantum computing system 120 at a predetermined frequency, by receiving event-driven notifications from the control system 124, or by executing data acquisition routines in response to corresponding requests (e.g., from external computing systems, operator input, etc.).

In some implementations, the data obtainer 135 can execute in response to a request to perform calibration of the quantum computing system 120, in response to detection of performance degradation by a monitoring process (e.g., as described in connection with FIG. 5), and/or in response to an external command issued by a user or management interface. In some implementations, the data obtainer 135 can identify a specific quantum computing system 120 by using an identifier of the quantum computing system 120 and/or quantum processors 122, a hardware address, or a network endpoint, and can obtain telemetry data 125 from the corresponding quantum processor(s) 122, the control system 124, and/or other components of the quantum computing system 120 by initiating a data retrieval operation through one or more hardware interfaces/communication buses.

The telemetry data 125 obtained by the data obtainer 135 can include operational parameters such as qubit frequencies, flux bias values, drive amplitudes, and readout pulse durations, measurement results such as qubit state populations, gate fidelities, and error rates, and device status indicators such as temperature, voltage, or error flags, among others. The data obtainer 135 can retrieve or capture telemetry data 125 using techniques such as direct hardware interface polling, message-based communication protocols (e.g., Serial Peripheral Interface (SPI), Inter-Integrated Circuit (I2C), Ethernet, and/or other protocols), or memory-mapped register reads, among others. The data obtainer 135 can format telemetry data 125 as structured records, attribute vectors, and/or time-stamped data entries, and can store the telemetry data 125 within a designated region of storage 115, indexed by quantum processor identifier, parameter type, and acquisition timestamp.

In some implementations, the data obtainer 135 can generate metadata fields for each telemetry data 125 entry, such as experiment identifier, calibration cycle number, or data quality flags, to facilitate downstream access and traceability. The telemetry data 125 can be accessed by other components of the data processing system 105, such as the graph updater 140 or the quantum system controller 160, for use in graph construction, parameter estimation, or calibration control operations. The data obtainer 135 can implement data integrity checks, such as cyclic redundancy check validation or range checking, to detect and flag invalid or corrupted telemetry data 125 prior to storage. In some implementations, the data obtainer 135 can archive or discard telemetry data 125 that is determined to be obsolete, redundant, or outside a defined retention window, according to system configuration or operational policy. The data obtainer 135 can maintain a log of telemetry data 125 acquisition events, including timestamps, source identifiers, and data volume metrics, for audit or diagnostic purposes.

The data obtainer 135 can initiate telemetry data 125 retrieval in response to a variety of triggers or conditions, such as the start of a calibration cycle, periodic performance monitoring intervals, detection of system events (e.g., hardware faults, temperature excursions, communication errors, etc.), or receipt of external commands from a supervisory management process. In some implementations, the data obtainer 135 can coordinate with the calibration scheduler or monitoring system to synchronize telemetry data 125 acquisition with scheduled or event-driven calibration activities. The data obtainer 135 can dynamically adjust the frequency, granularity, or scope of telemetry data 125 retrieval based on operational context, such as increasing acquisition rates during active calibration or reducing data volume during idle periods (e.g., determined according to control signals from the control system 124 and/or job processing information maintained by the data processing system 105).

The telemetry data 125 obtained by the data obtainer 135 can correspond to the operational parameters for the quantum computing system 120 (e.g., a first set of operational parameters). Such operational parameters may be parameters used to operate the quantum computing system 120, quantum processor(s) 122, and/or control system(s) 124. The telemetry data 125 can include operational and measurement data obtained from the quantum processor(s) 122. The telemetry data 125 can represent a snapshot of the current operational state of the quantum computing system 120, including both control settings and measured outcomes.

The telemetry data 125 can include fields such as qubit frequencies, anharmonicity values, readout fidelity values, gate error rate values, flux bias values, drive amplitude values, qubit types, qubit fabrication parameters, coupling strength values, inter-qubit distance values, crosstalk coefficients, two-qubit gate fidelity values, resonance frequencies, and/or coupling tunability values, among others. Each field in the telemetry data 125 can be stored as a floating point value, integer, or categorical value, and can be associated with a specified unit or value range as appropriate for the corresponding parameter. The telemetry data 125 need not necessarily be stored in a single data structure, and it will be appreciated that any portion of the telemetry data 125 may be obtained separately or individually by the data obtainer 135. The telemetry data 125 can be timestamped or indexed by acquisition time, calibration cycle identifier, and/or calibration experiment 180 identifier (e.g., for inclusion as part of corresponding results 184).

In some implementations, the telemetry data 125 can be associated with a specific calibration cycle or operational event, and can be accessed by other components of the data processing system 105 for use in calibration parameter estimation, model training, and/or calibration experiment 180 scheduling, as described herein. The telemetry data 125 can include various measurement results such as qubit state populations, error rates, or gate fidelities, and can store control settings such as bias points or pulse amplitudes applied during the corresponding measurement. The telemetry data 125 can correspond to particular quantum processing operations, calibration experiments 180, and/or time periods (e.g., ranges of time stamps). The telemetry data 125 can be formatted as structured records or attribute vectors, and can include metadata fields for device identifier, and/ calibration experiment 180 type or identifier. The telemetry data 125 can be maintained in storage 115 for retrieval and update during subsequent calibration cycles or operational events. The telemetry data 125 can be incorporated into the spatio-temporal graph 170 to represent both the spatial and temporal aspects of quantum processor operation, as described in further detail herein.

As described herein, the telemetry data 125 can include at least one of a qubit frequency, an anharmonicity value, a readout fidelity value, a gate error rate value, a flux bias value, a drive amplitude value, a qubit type, a qubit fabrication parameter, a coupling strength value, an inter-qubit distance value, a crosstalk coefficient, a two-qubit gate fidelity value, a resonance frequency, or a coupling tunability value. An anharmonicity value can represent the deviation of a qubit's energy level spacing from perfect harmonicity, and can be expressed as a floating-point value in units of, for example, gigahertz, derived from spectroscopy measurements performed by the quantum computing system 120. A readout fidelity value can indicate the probability of correctly identifying a qubit's state and can be stored as a floating-point value between zero and one, computed from one or more measurement outcomes. A gate error rate value can quantify the probability of an error occurring during a quantum gate operation, and can be represented as a floating-point value, and can be measured through randomized protocols specified in corresponding calibration experiments 180.

A flux bias value can specify the applied magnetic flux to a superconducting qubit, and can be stored as a floating-point value in units of, for example, magnetic flux quanta, measured by the control system 124 interfaced with the quantum processor 122. A drive amplitude value can indicate the amplitude of the microwave drive applied to a qubit and can be stored as a floating-point value in units of, for example, millivolts or decibels, determined by calibration routines. A qubit type can classify the physical implementation of a qubit (e.g., transmon, flux, spin, etc.), and can be represented as a categorical value selected based on fabrication records or device characterization. A qubit fabrication parameter can specify process or material details, such as junction area or substrate type, and can be stored as a categorical or floating-point value obtained from device fabrication records.

A coupling strength value can indicate the magnitude of interaction between two qubits and can be stored as a floating-point value in units of, for example, frequency such as megahertz, determined by two-qubit spectroscopy or swap calibration experiments 180. An inter-qubit distance value can specify the physical separation between qubits, and can be stored as a floating-point value, for example, in micrometers or millimeters, determined from chip layout data. A crosstalk coefficient can quantify the extent to which a control or measurement signal applied to one qubit affects another qubit, and can be stored as a floating-point value, derived from calibration experiments or system identification routines. A two-qubit gate fidelity value can indicate the accuracy of a two-qubit gate operation and can be stored as a floating-point value between zero and one, determined by quantum process tomography or benchmarking operations. A resonance frequency can specify the frequency at which a qubit or resonator responds most strongly to excitation, and can be stored as a floating-point value, for example, in units of gigahertz, measured by frequency sweep experiments. A coupling tunability value can indicate the range over which a coupling strength can be adjusted, and can be stored as a floating-point value or interval, determined from device characterization or calibration data.

Telemetry data 125 obtained according to the techniques described herein can be updated to update a spatio-temporal graph 170 corresponding to the quantum computing system 120 to be calibrated. Multiple spatio-temporal graphs 170 may be used to represent multiple quantum computing systems 120 and/or quantum processor(s) 122. The graph updater 140 can generate the spatio-temporal graph 170 based on the telemetry data 125 and the first set of operational parameters. The graph updater 140 can be a processing component that can construct or update the spatio-temporal graph 170 using telemetry data 125 and current operational parameters. The graph updater 140 can include hardware, software, or combinations thereof. The graph updater 140 can generate nodes 172 by extracting qubit and device attributes from telemetry data 125 and assigning each attribute to a corresponding node 172, where each node 172 can represent a qubit, a readout resonator, or another component of the quantum processor.

The graph updater 140 can generate edges 174 by identifying physical or logical relationships between pairs of nodes 172, such as coupling strength, crosstalk, or shared control lines, and can assign attributes to each edge 174 based on device topology or measurement data. The graph updater 140 can incorporate temporal information by creating additional nodes 172 for each qubit or component at different time indices and connecting each such node 172 to a previous corresponding node 172 by a temporal edge 174 that can encode time-based relationships or parameter changes. The generated spatio-temporal graph 170 can be stored as an adjacency list, matrix, or serialized graph object within storage 115, where each node 172 and edge 174 can be indexed by identifier, parameter type, or time index. The graph updater 140 can generate or update the spatio-temporal graph 170 in response to triggers such as the receipt of new telemetry data 125, completion of a calibration experiment 180, or detection of performance drift during monitoring of quantum computing system 120 operation.

The graph updater 140 can generate or update the spatio-temporal graph 170 by creating nodes 172 that respectively correspond to a set of qubits of the quantum processor(s) 122. The graph updater 140 can create a node 172 for each qubit detected in the quantum processor(s) 122, using a unique identifier derived from telemetry data 125 or device configuration records. Each node 172 can be assigned a set of attributes that include operational parameters such as qubit frequency, coherence time, flux bias, drive amplitude, and readout fidelity, static properties such as qubit type or fabrication details, and a time index that specifies the calibration cycle or measurement period. In some implementations, the graph updater 140 can maintain consistency of node identifiers across updates or calibration cycles by referencing a persistent mapping between hardware addresses and node identifiers, and by propagating this mapping when generating new nodes 172 for subsequent time indices. The graph updater 140 can store each node 172 as an attribute vector or structured record within the spatio-temporal graph 170, with fields for each operational parameter, static property, and time index. In some implementations, the graph updater 140 can create additional nodes 172 for the same physical qubit at different time indices, such that each temporal node 172 represents the state of the qubit at a specific calibration cycle or measurement interval.

In some implementations, each node 172 can be associated with other data structures, such as parameter ranges 175 and/or calibration experiments 180, by storing references/pointers/identifiers to such data structures. In some implementations, the graph updater 140 can update the spatio-temporal graph 170 by appending a new temporal node 172 for a qubit when new telemetry data 125 is received, and by linking the new node 172 to the previous temporal node 172 using a temporal edge 174. The graph updater 140 can ensure that each temporal node 172 maintains the same identifier for the underlying qubit, while updating the time index and corresponding attributes to reflect the most recent measurement data/operational parameters. In some implementations, the graph updater 140 can archive or remove obsolete temporal nodes 172 (e.g., nodes corresponding to a particular timestamp and/or range of time values) based on data retention policies or other configuration settings.

In some implementations, the graph updater 140 can generate or update the spatio-temporal graph 170 by creating at least one edge 174 corresponding to a relationship between two of the set of nodes 172. The graph updater 140 can generate edges 174 to represent relationships between pairs of nodes 172, such as physical couplings, logical dependencies, or shared control lines, among others. Each edge 174 can be assigned one or more attributes, such as coupling strength, crosstalk coefficient, or time-based metrics that quantify the magnitude, directionality, or temporal variation of the relationship between the connected nodes 172. The graph updater 140 can determine which pairs of nodes 172 should be connected by edges 174 by referencing device topology data, measurement results, or configuration records that specify physical connectivity or observed parameter dependencies. In some implementations, the graph updater 140 can create temporal edges 174 by connecting instances of the same node 172 at different time indices, where each temporal edge 174 can encode information about changes in operational parameters or calibration results over successive calibration cycles.

The edges 174 can be stored within the spatio-temporal graph 170 using a data format such as an edge list, adjacency matrix, or attribute table, with each edge 174 indexed by the identifiers of the connected nodes 172 and, for temporal edges 174, by a time index or calibration cycle identifier. Each edge 174 can be associated with other data structures, such as calibration experiments 180 or parameter ranges 175, by storing references or pointers to the relevant experiment or parameter data within the edge 174 record. In some implementations, the graph updater 140 can assign additional metadata to each edge 174, such as a timestamp and/or calibration experiment 180 identifier. The graph updater 140 can update or remove edges 174 in response to changes in device configuration, hardware faults, and/or updated measurement data, for example, when relationships between qubits and/or resonator circuits are no longer valid or no longer exist.

The generated/updated spatio-temporal graph 170 for a quantum computing system 120 and/or quantum processor 122 can be used to perform automatic calibration. The model executor 145 can include software, hardware, or combinations thereof. The model executor 145 can extract relevant portions of the spatio-temporal graph 170 and format the extracted data as input for the graph neural network 150. For example, the model executor 145 can extract/select/identify nodes 172 representing qubits/resonators and edges 174 representing the relationships thereof for a current timestep (or most recent timestep) and provide the attributes thereof as input to the graph neural network 150. The model executor 145 may derive timeseries attribute data, for example by traversing nodes 172 along their respective temporal edges 174, to generate timeseries data structures for temporal processing via the graph neural network 150. Further details of how the spatio-temporal graph 170 is processed using the graph neural network 150 are described in connection with FIGS. 2 and 6.

In some implementations, the model executor 145 can provide the entirety of the spatio-temporal graph 170 as input to the graph neural network 150, for example, when global context is required for calibration parameter estimation. The model executor 145 can select nodes 172, edges 174, or attributes for inclusion in the input based on criteria such as node type, time index, or relevance to the calibration task (e.g., nodes that are identified as corresponding to the specific quantum processor 122 to be calibrated, etc.), and can apply preprocessing or normalization steps such as scaling parameter values, encoding categorical attributes, or removing incomplete entries.

The model executor 145 can transmit/provide the graph data to the graph neural network 150 using a data format or schema such as serialized objects, adjacency matrices, and/or tensor representations, in a manner compatible with the input layer(s) of the graph neural network 150. The graph neural network 150 can generate a set of parameter ranges 175 for operation of the quantum processor(s) 122 based on the provided input. In some implementations, the model executor 145 can detect incomplete or inconsistent graph data and can apply error handling or fallback procedures such as substituting default parameter values, omitting invalid nodes 172 or edges 174, or generating an error message for further review by another component of the data processing system 105. The model executor 145 can store the output parameter ranges 175 in a designated region of storage 115, indexed by quantum processor 122 identifier, calibration experiment 180 identifier, and/or parameter type. The model executor 145 can access the generated parameter ranges 175 for use in subsequent calibration operations, as described in further detail herein.

The graph neural network 150 can generate the set of parameter ranges 175 for operation of the quantum processor(s) 122 based on the spatio-temporal graph 170. The graph neural network 150 can be executed by the model executor 145 using input data derived from the spatio-temporal graph 170 to estimate parameter ranges 175 for the quantum processor(s) 122 and/or the quantum computing system 120. The graph neural network 150 can process input data by receiving node and edge attributes from the spatio-temporal graph 170 at an input layer, where the input data can include qubit parameters, device model information, coupling strengths, control line data, measurement history, and metadata. The graph neural network 150 can apply graph convolutional operations to the input layer to aggregate spatial information across nodes and edges, and can apply temporal convolutional operations to capture changes in node and edge features over time indices. The graph neural network 150 can generate output at an output layer, where the output can include parameter ranges 175, uncertainty estimates, and initial pulse shapes, as described in connection with FIG. 2. The parameter ranges 175 generated by the graph neural network 150 can include intervals for drive amplitude, drive frequency, flux bias, coupler bias, readout frequency, readout pulse amplitude, readout pulse duration, or other qubit or resonator control parameters.

Figure 2:
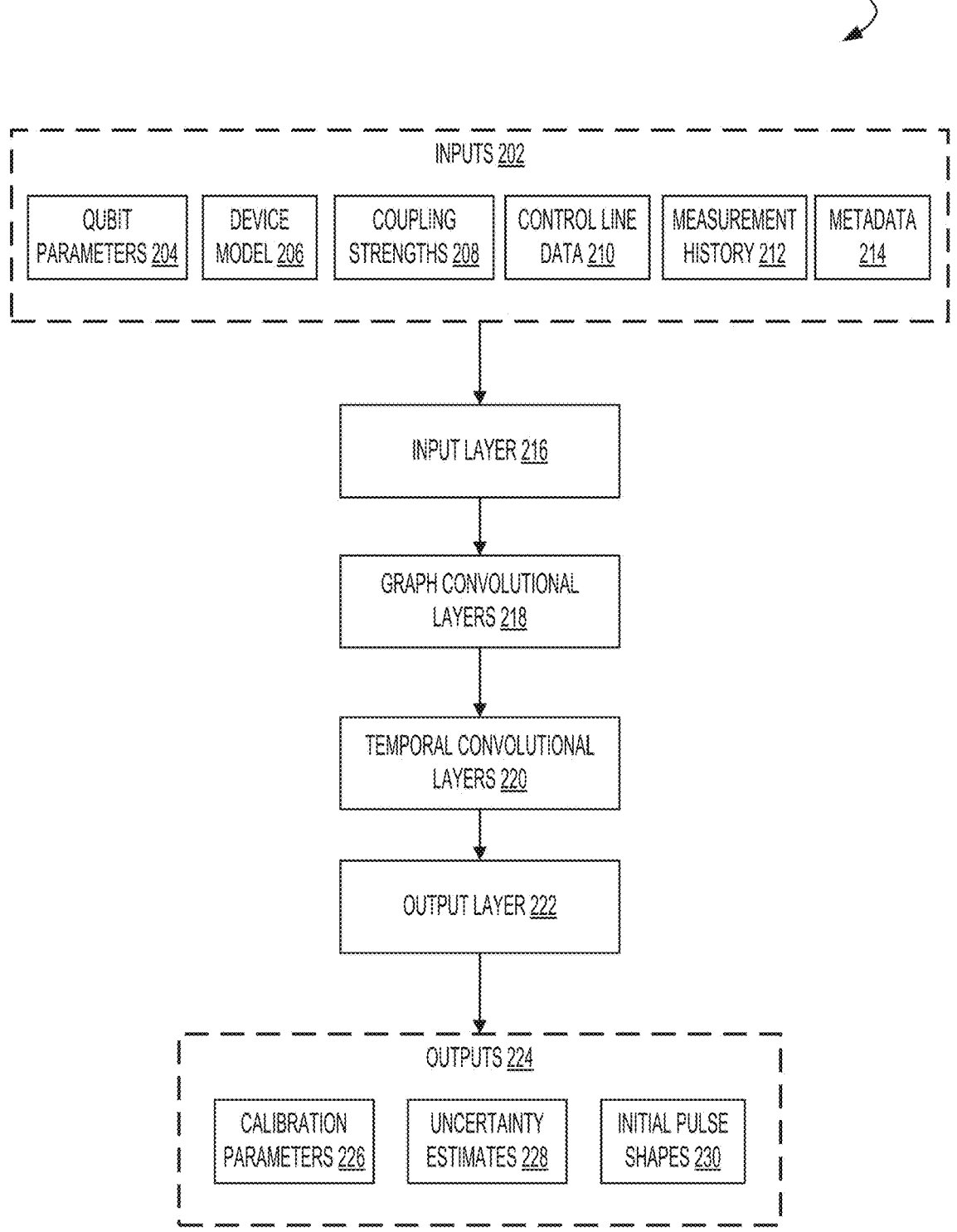
FIG. 2 is a block diagram illustrating an example architecture of a graph neural network (GNN) used in connection with various operations described herein, in accordance with one or more implementations.

Referring now to FIG. 2, illustrated is a block diagram of an example architecture of a Graph Neural Network (GNN) 200 used in connection with various operations described herein. The diagram 200 can include inputs 202, an input layer 216, graph convolutional layers 218, temporal convolutional layers 220, an output layer 222, and outputs 224. The inputs 202 can include qubit parameters 204, a device model 206, coupling strengths 208, control line data 210, measurement history 212, and metadata 214. The outputs 224 can include calibration parameters 226, uncertainty estimates 228, and initial pulse shapes 230.

The diagram 200 can illustrate an example architecture of a Graph Neural Network (GNN) used in connection with various operations described herein. For example, the GNN shown in the diagram may be used to implement the graph neural network 150 of FIG. 1. A GNN can process data that is represented as a graph structure, where nodes and edges can encode relationships and attributes among entities. The GNN can apply neural network operations over the graph, including message passing and aggregation steps, to generate feature representations that capture both local and global dependencies. The GNN can include multiple layers that sequentially update node and edge features based on information from neighboring nodes and edges. The GNN can incorporate both spatial and temporal processing techniques to address data that changes over time across a spatio-temporal graph network. The GNN can generate outputs that reflect the learned relationships and patterns within the graph, as described in further detail herein.

In this example, the graph neural network shown in the diagram 200 can include the input layer 216, which can receive the inputs 202. The input layer 216 can process unstructured data, such as data of arbitrary length to accommodate a spatio-temporal graph (e.g., the spatio-temporal graph 170 of FIG. 1) with a variable number of nodes. In some implementations, the input layer 216 can receive data in a sequential, tabular, or graph-based format. The input layer 216 can receive the transformed/encoded forms of the input data 202 that is suitable for processing via subsequent layers of the graph neural network shown in the diagram 200. In some implementations, the input layer 216 may include one or more aggregation/embedding layers that further encode the input data 202 to facilitate further processing. The data stored/provided to the input layer 216 can be passed/provided as input to the graph convolutional layers 218.

The inputs 202 can include qubit parameters 204, a device model 206, coupling strengths 208, control line data 210, measurement history 212, and metadata 214. The inputs 202 can be represented as a spatio-temporal graph structure, where each node can correspond to a physical or logical component of a quantum computing system to be calibrated, and each node can store attributes that encode both current operational data and time-series data reflecting parameter changes across calibration cycles. The qubit parameters 204 can include values such as resonance frequency, anharmonicity, coherence times, readout fidelity, or gate error rates, among other described herein, and can be stored as attribute vectors associated with nodes representing individual qubits. The device model 206 can specify hardware configuration information, such as chip layout, qubit type, or fabrication process, and can be included as static attributes of the corresponding nodes or as global attributes accessible by all nodes in the graph. The coupling strengths 208 can represent interaction metrics between qubits, such as capacitive or inductive coupling values, and can be stored as edge attributes between nodes representing coupled qubits. The control line data 210 can include parameters such as drive amplitude, flux bias, or readout pulse settings, and can be stored as node attributes or as attributes of edges connecting nodes to control hardware components.

The measurement history 212 can be maintained as a time-indexed series of calibration or operational results, where each entry can record the outcome of a calibration experiment or operational measurement for a given node and time index, and can be stored as a sequence of attribute vectors or records associated with the corresponding node. The metadata 214 can encompass device identifiers, fabrication details, or experiment context, and can be stored as node attributes, edge attributes, or as global graph attributes, depending on the scope of the information. Each node in the spatio-temporal graph can store a composite attribute vector that includes both static and dynamic features, with time-series data indexed by calibration cycle or measurement timestamp. In some implementations, the spatio-temporal graph can include temporal edges that connect instances of the same node at different time indices, enabling the representation of parameter drift or other dynamic changes. The data content and structure of the inputs 202 can facilitate the representation of both the operational state and the structural configuration of the quantum processor for calibration parameter estimation. Further details of how the features of the input data can be aggregated via the GNN are described in connection with FIG. 6.

The GNN shown in the diagram 200 can include one or more graph convolutional layers 218 and one or more temporal convolutional layers 220. The graph convolutional layers 218 can execute neural network operations over the spatial structure of the input graph by updating node and edge feature vectors based on connectivity and local attributes. Each graph convolutional layer 218 can aggregate information from neighboring nodes and edges, propagating feature updates through the graph to capture spatial dependencies identified in the edge features (e.g., the attributes of the edges 174 of FIG. 1). In some implementations, the graph convolutional layers 218 can generate updated feature representations for each node and edge by combining feature values from adjacent nodes, adjacent edges, and the node or edge itself. The spatial aggregation performed by the graph convolutional layers 218 can enable the GNN shown in the diagram 200 to represent device-specific interactions among qubits, resonators, and couplers, among others. In some implementations, the output feature maps generated by the graph convolutional layers 218 can be provided as input to the temporal convolutional layers 220. Further details of the aggregation process performed via the graph convolutional layers 218 are described in connection with FIG. 6.

The temporal convolutional layers 220 can process time-indexed feature vectors by applying convolutional operations across sequential graph states to model parameter drift and dynamic changes in device behavior. The temporal convolutional layers 220 can receive as input the output feature maps from the spatial graph convolutional layers 218, allowing the GNN shown in the diagram 200 to jointly model spatial and temporal correlations in the calibration data. In some implementations, the temporal convolutional layers 220 can generate updated feature representations for each node and edge at each time index by combining feature values from previous time indices, current time indices, and the output of the spatial graph convolutional layers 218. The temporal convolutional layers 220 can enable the GNN shown in the diagram 200 to represent calibration parameter drift, operational changes, and other time-dependent effects observed in quantum processor operation. The data flow through the GNN shown in the diagram 200 can include spatial aggregation by the graph convolutional layers 218 followed by temporal processing by the temporal convolutional layers 220. The output of the temporal convolutional layers 220 can be provided to the output layer 222 for calibration parameter estimation.

Figure 6:
FIG. 6 is a data flow diagram illustrating aggregation and processing operations of a spatio-temporal graph neural network for quantum computing system calibration, in accordance with one or more implementations.

Although the temporal convolutional layers 220 are depicted as following the graph convolutional layers 218 in the diagram 200, the temporal convolutional layers 220 may appear in any order within the spatio-temporal GNN shown in the diagram 200. In some implementations, the temporal convolutional layers 220 may be positioned prior to the graph convolutional layers 218, such that temporal feature aggregation occurs before spatial feature aggregation. In some implementations, the temporal convolutional layers 220 may be arranged in parallel with one or more of the graph convolutional layers 218, such that temporal and spatial feature processing are performed concurrently on the input data and later combined in subsequent processing steps (e.g., as shown in FIG. 6). In some implementations, one or more of the temporal convolutional layers 220 may be interleaved with one or more of the graph convolutional layers 218, such that alternating layers perform spatial and temporal aggregation in sequence. Any number of temporal convolutional layers 220 and/or graph convolutional layers 218 may be included in the spatio-temporal GNN shown in the diagram 200.

The GNN shown in the diagram 200 can generate output feature representations at each stage of the network, with the final output of the layers of the GNN provided to the output layer 222. Each layer of the GNN shown in the diagram 200 can receive as input the feature maps generated by the preceding layer and can generate updated feature maps for downstream processing. In some implementations, the output layer 222 can generate calibration parameter 226 (e.g., ranges), uncertainty values 228, and initial pulse shapes 230 (or identifiers thereof) based on the final feature representations generated by the temporal convolutional layers 220. The output layer 222 can provide the outputs 224. The output layer 222 can be the final processing stage of the spatio-temporal GNN shown in the diagram 200. The output layer 222 can receive as input the feature maps or aggregated representations generated by the previous layers of the GNN (shown in this example as the temporal layers 220). The output layer 222 can transform the received feature maps into output values relevant for quantum processor calibration, as described herein. The output layer 222 may include one or more fully connected layers, one or more regression layers, one or more pooling or softmax layers, or combinations thereof. In some implementations, the output layer 222 can generate calibration parameters 226, uncertainty estimates 228, and initial pulse shapes 230.

The calibration parameters 226 generated by the output layer 222 can represent estimated ranges of values for quantum processor control variables within which the quantum processor is to be calibrated. The calibration parameters 226 can include ranges of values for control variables such as qubit drive amplitude, drive frequency, flux bias, or readout settings, among any other control variable described herein. The calibration parameters 226 can be output in a form suitable for direct application to hardware or for further processing operations described herein. The output layer 222 can generate the calibration parameters 226 by applying learned transformations to the feature maps received from the temporal convolutional layers 220. In some implementations, the calibration parameters 226 can be stored in a designated region of memory or storage for retrieval by other system components. The calibration parameters 226 can be referenced by identifiers corresponding to the associated qubit, resonator, and/or control channel.

The uncertainty estimates 228 generated by the output layer 222 can quantify the confidence or reliability of the predictions of the corresponding calibration parameters 226. The uncertainty estimates 228 can be used to support downstream decision-making processes, such as Bayesian optimization techniques described herein. The uncertainty estimates 228 can be represented as standard deviations, confidence intervals, and/or probability distributions associated with each calibration parameter 226. In some implementations, the uncertainty estimates 228 can be stored in association with the corresponding calibration parameters 226 in memory or storage.

The initial pulse shapes 230 generated by the output layer 222 can provide suggested control pulse configurations for quantum processor operations. The initial pulse shapes 230 can be used as starting points for further pulse optimization or for direct hardware application. The initial pulse shapes 230 can be stored in a pulse library or supplied to an optimal control process for refinement. The output layer 222 can generate the initial pulse shapes 230 in representations such as amplitude and phase envelopes, time-domain samples, and/or parameterized waveform descriptors. Each initial pulse shape 230 can be associated with a corresponding control device and/or quantum operation. As noted above, further details of the aggregation and feature generation processes of the GNN shown in the diagram 200 are described in connection with FIG. 6.

Referring now to FIG. 6, illustrated is a data flow diagram 600 depicting aggregation and processing operations of a spatio-temporal GNN for quantum computing system calibration. The data flow diagram 600 can include the spatio-temporal graph 170, an aggregation process 602. The aggregation process 602 can include message passing operations 604, node/edge feature update operations 605, readout feature update operations 606, device parameter update operations 608, global feature update operations 610, and graph-level pooling operations 612.

Referring to FIG. 6, illustrated is a data flow diagram 600 depicting aggregation and processing operations of a spatio-temporal GNN for quantum computing system calibration. The data flow diagram 600 can include a spatio-temporal graph 170, which can represent the quantum processor as a graph structure with nodes and edges encoding both spatial and temporal features. The spatio-temporal graph 170 can be generated based on telemetry data and operational parameters, and can include nodes representing qubits, readout resonators, or other quantum processor components, and edges representing couplings, crosstalk, or temporal relationships among nodes. The spatio-temporal graph 170 can be provided as input to an aggregation process 602, which can perform a series of neural network operations (e.g., implemented by the graph neural network 150, etc.) to generate feature representations for calibration parameter estimation. In some implementations, the spatio-temporal graph 170 can encode device-specific parameters, measurement history, and time-indexed calibration data, facilitating the representation of both static and dynamic characteristics of the quantum processor. The aggregation process 602 can process the spatio-temporal graph 170 by sequentially applying message passing, feature updates, and pooling operations, as described in further detail herein.

The aggregation process 602 may begin with a message passing operation 604, in which the feature vectors of nodes 172 and edges 174 in the spatio-temporal graph 170 (or subsets thereof, such as those that represent the qubits/resonators and relationships thereof for a current timestep) updated as a function of their neighbors' (e.g., adjacent in the graph 170) current feature vectors (e.g., the attributes of the nodes themselves as described in connection with FIG. 1) and the features of the connecting edges 174. The connectivity structure of the spatio-temporal graph 170 remains fixed during the message passing operation 604 of the aggregation process 602, and results are stored in additional data structures allocated for the aforementioned processing operations.

In one example, for each node v, messages may be computed from each neighbor u in a neighbor list (e.g., adjacency list) N(v) by applying a learned transformation function, for example, a neural network layer that takes as input the current feature vector of u, the current feature vector of v, and any edge attributes (e.g., connectivity strength, qubit coupling strength, etc.) for the edge (u, v). In one example, the messages may be combined using a permutation-invariant aggregation operation, for example, summation, averaging, or attention-weighted pooling, to generate an aggregated message representation for node v. In some implementations, a learned update function may use the aggregated message representation to compute a new feature vector for node v. In some implementations, similar computations may be applied to update edge feature vectors, without altering the connectivity of the spatio-temporal graph 170 and storing the updated features in additional data structures allocated for such operations. The message passing operation 604 may be executed for any number of steps. In some implementations, repeating the message passing operation 604 for a fixed number of steps may result in node and edge feature vectors that incorporate information from multiple "hops" away in the spatio-temporal graph 170. The final updated feature vectors may be provided as input to downstream components, for example, to model spatial dependencies and inter-qubit interactions relevant for calibration parameter estimation.

The temporal processing operations 614 can include processing time-series data corresponding to some or all features of the spatio-temporal graph 170, including node features and edge features, by providing the time-indexed values of such features as input to one or more temporal convolutional layers. The temporal processing operations 614 can include receiving, for each node and edge in the spatio-temporal graph 170, a sequence of feature vectors indexed by calibration cycle, measurement interval, and/or other time step index, and can include stacking or concatenating these vectors to form an input tensor suitable for temporal convolution operations. In some implementations, the temporal processing operations 614 can include extracting temporal features from the spatio-temporal graph 170 by accessing multiple historical attribute values included in the nodes and edges of the graph, where each attribute value can correspond to a distinct time index.

The temporal processing operations 614 can include generating, for each node and edge, a time-ordered series of feature vectors by traversing the spatio-temporal graph 170 along temporal edges or by referencing timestamped records stored in association with each node or edge. The temporal processing operations 614 can include formatting the extracted time-series feature vectors as a multi-dimensional tensor, where in some implementations one dimension can correspond to the time index and additional dimensions can correspond to the feature set for each node or edge. The temporal processing operations 614 can include applying one or more temporal convolutional layers to the input tensor, where each temporal convolutional layer can include generating updated feature representations by aggregating information across multiple time steps using learned filters/kernels.

The temporal processing operations 614 can include generating output tensors that encode the temporal dependencies and parameter drift for each node and edge and can include providing these output tensors as input to the node/edge feature update process 604. The output of the temporal processing operations 614 can be aligned with the current time index of the spatio-temporal graph 170, such that the node/edge feature update process 604 can include updating feature vectors for each node and edge based on both the most recent measurement data and the temporal context provided by the temporal convolutional layers. In some implementations, the temporal processing operations 614 can be executed in parallel with or prior to the spatial aggregation steps, and the resulting feature representations can be merged or concatenated prior to further processing in the node/edge feature update operation 605. In some implementations, the temporal processing operations 614 can include selecting a subset of time indices for feature extraction based on a sliding window, a fixed historical depth, and/or specified/configured time range. The temporal processing operations 614 can include storing the extracted temporal features and the resulting output tensors/data structures in one or more regions of memory.

Following message passing, the aggregation process 602 can include executing a node/edge feature update operation 605, which can update the feature vectors of nodes and edges based on the aggregated messages received during the message passing operations 604 and the temporal processing operations 614. The node/edge feature update operation 605 can apply neural network layers, such as convolutional layers or fully connected layers, to transform the concatenated feature vectors into updated representations that capture both local and propagated information. In some implementations, the node/edge feature update operation 605 can receive as input the output of the temporal processing 614. The node/edge feature update operation 605 can incorporate non-linear activation functions, normalization layers, and/or residual connections. The updated node and edge feature vectors can encode refined estimates of qubit parameters, coupling strengths, or calibration uncertainties, among any other attribute or parameter described herein. In some implementations, the node/edge feature update operation 605 can be repeated in conjunction with additional rounds of message passing. The node/edge feature update operation 605 can store the updated feature vectors in memory for downstream processing or for use by subsequent aggregation or pooling operations.

After the node and edge feature update operation 605, the readout feature update operation 606 can process feature vectors associated with readout resonator nodes in the spatio-temporal graph 170. For each readout resonator node, the readout feature update operation 606 can include generating an updated feature vector based on the current feature vector of the readout resonator node, the updated feature vectors of any qubit nodes connected to the readout resonator node from the previous stage, and the edge feature vectors/tensors representing the couplings between the readout resonator node and those qubit nodes. The readout feature update operation 606 can include applying a learned transformation function (e.g., convolutional layers, fully connected layers, other machine-learning layers etc.) to each triplet comprising a qubit node, an edge, and a readout resonator node to generate a message embedding for the readout resonator node. The aggregated feature vectors for the qubit nodes and/or corresponding edges generated in connection with operation 604 may be used, in some implementations.

The readout feature update operation 606 can include aggregating the message embeddings for a given readout resonator node using, for example, a permutation-invariant operator to generate an aggregated message representation for that readout resonator node. The readout feature update operation 606 can include applying a learned update function (e.g., convolutional layers, fully connected layers, other machine-learning layers etc.) that receives as input the aggregated message representation and the current feature vector of the readout resonator node and outputs a new feature vector for the readout resonator node. The updated feature vectors generated by the readout feature update operation 606 can reflect both the intrinsic properties of the readout resonator nodes (e.g., resonator frequency, quality factor, dispersive shift, readout pulse shape, readout duration, etc.), and the state of the qubit nodes to which the readout resonator nodes are connected.

The device parameter update operation 608 can include updating feature vectors associated with device-specific parameters by generating a single device-specific parameter vector after the readout feature update operation 606. The device-specific parameters 616 (e.g., a vector, etc.) can include values describing the fixed hardware configuration of the quantum processor, such as device model, chip layout, and control line specifications, digital-to-analog converter (DAC) resolution, analog-to-digital converter (ADC) resolution, allowed pulse shapes, and hardware constraints, of the corresponding quantum processor(s) (e.g., quantum processor(s) 122) being calibrated. At this stage, feature vectors have been updated for each qubit node, each coupler, and each readout resonator node according to the attributes/parameters associated with those nodes and corresponding time-series data derived from the spatio-temporal graph 170.

The device parameter update operation 608 can include copying the device-specific parameters 616 for each updated set of qubit node features, edge features, and each readout resonator node features generated in prior processing steps. In one example, the device parameter update operation 608 can include concatenating the device-specific parameters 616 vector to the updated feature vectors generated in operations 604-606, resulting in an updated set of feature vectors that both the learned features from previous operations 604 and the fixed device parameters. Each of the generated feature vectors/data structure can be passed through a learned transformation layer (e.g., a convolutional layer, one or more fully connected layers, etc.) to generate a new set of feature vectors that incorporate the effect of the device-specific parameters. The device parameter update operation 608 can provide the updated device parameter features to the global feature update operation 610, as shown.

After device parameter integration, a set of global features 618 can be generated or accessed that represent environmental and operational conditions of the quantum processor at the time of operation, for example, corresponding to when the attributes of the nodes and edges used in prior operations were generated. The global features 618 can include temperature, magnetic field, total gate depth, chip generation, fabrication batch, or cooldown cycle, among others. The global features 618 can be copied for each output vector generated by the device parameter update 608. The copied global feature vector can be concatenated with each output vector as described in connection with the device parameter update 608. The updated concatenated vectors can be passed through one or more learned transformation layers (e.g., one or more convolutional layers, fully connected layers, other machine-learning layers, etc.) to generate a set of feature vectors that further encode global features of the quantum processor. The generated feature vectors can be provided to the graph-level pooling operation 612 for further aggregation.

The graph-level pooling operation 612 can include aggregating the feature vectors/data structures generated by operation 610 to generate a fixed-size data structure representation of the quantum processor being calibrated. The graph-level pooling operation 612 can include reducing a variable-sized set of component features into one or more processor-level feature vectors that summarize the current state of the system. The graph-level pooling operation 612 can include applying a permutation-invariant aggregation function across each set of component features, which in various implementations may include mean pooling (e.g., computing the average value for each feature vector/data structure), sum pooling (e.g., computing the total across feature vector/data structures), max pooling (e.g., selecting the maximum feature vector/data structure), and/or attention-based pooling (e.g., learning weighted combinations of component feature vectors/data structures). The aggregation performed by the graph-level pooling operation 612 can include generating an output feature vector/data structure while preserving at least a portion of information from individual component feature vectors. The pooled graph-level representation generated by the graph-level pooling operation 612 can be provided as input to one or more fully-connected/output layers (e.g., output layer 222 of FIG. 2) to generate calibration parameter ranges (e.g., calibration parameters 226), uncertainty estimates (e.g., uncertainty estimates 228), and/or initial pulse shapes (e.g., initial pulse shapes 230) for the quantum processor being calibrated.

Referring back to FIG. 1, after executing the graph neural network 150 (e.g., according to the operations described in connection with FIGS. 2 and 6), parameter ranges 175 (e.g., the calibration parameters 226, etc.) are generated and used to select/generate one or more test parameters 182 for one or more calibration experiments. The experiment generator 155 can be a processing component that selects test parameters for calibration experiments using Bayesian optimization, starting from the parameter ranges 175. The experiment generator 155 can receive the parameter ranges 175 and generate a probabilistic model, such as a Gaussian process regression model, to represent the expected relationship between candidate parameter values and a target performance metric.

In some implementations, the experiment generator 155 can use Bayesian optimization functions to maximize an acquisition function, for example, expected improvement or upper confidence bound, to generate a candidate set of parameters 182 for a calibration experiment 180. The experiment generator 155 can select test parameters 182 such as pulse amplitude, pulse frequency, and/or bias point, among others described herein, and can represent each parameter 182 as a floating-point value, integer value, and/or vector. The experiment generator 155 can update its probabilistic model and acquisition function after each calibration experiment 180 by incorporating feedback from measured outcomes or uncertainty estimates associated with previous test parameters 182, as described in further detail in connection with FIG. 3. The experiment generator 155 can associate each selected/generated set of test parameters 182 with a corresponding calibration experiment 180.

In some implementations, the experiment generator 155 can adjust the selection process by weighting candidate parameter regions with higher uncertainty or by prioritizing regions of the parameter space (e.g., via generated weight parameters using Bayesian optimization) that have not been previously explored. The experiment generator 155 can repeat the acquisition function maximization and candidate parameter generation steps until a stopping criterion is met, such as convergence of the performance metric and/or reduction of uncertainty below a threshold.

In some implementations, the experiment generator 155 can select the first set of test parameters 182 by applying the Bayesian optimization function based on a target metric and an uncertainty estimate associated with the target metric. The experiment generator 155 can receive an initial parameter range suggested by the graph neural network 150 and select an initial test parameter value within that range, for example, a drive amplitude value of 2.5 millivolts. The experiment generator 155 can cause execution of a calibration experiment 180 using the selected test parameter value and can measure a performance metric of interest, such as qubit fidelity, gate error rate, or another performance indicator. The experiment generator 155 can update a probabilistic model, such as a Gaussian process regression model, to represent the relationship between the test parameter value and the measured performance metric, where the model includes a mean estimate and an associated predictive variance.

In some implementations, the experiment generator 155 can use the predictive variance to compute an uncertainty estimate for each candidate test parameter 182 value in the parameter space. In some implementations, the uncertainty estimates 228 of FIG. 2 generated by the graph neural network 150. The experiment generator 155 can select subsequent test parameters 182 by maximizing an acquisition function (e.g., expected improvement or upper confidence bound, etc.), which incorporates both the predicted performance and the uncertainty estimate, such that the next experiment point (e.g., set of test parameters 182) is selected/generated where the predicted performance is high and/or the uncertainty is large. The experiment generator 155 can repeat the process of selecting test parameters 182, executing calibration experiments 180, measuring performance metrics, and updating the probabilistic model, such that the uncertainty region in the parameter space decreases after each iteration and the selected test parameters 182 converge toward an optimal calibration setting, as shown in the feedback loop of FIG. 3.

In some implementations, the experiment generator 155 can extend the Bayesian optimization process to multiple dimensions when several test parameters 182 require simultaneous tuning, such as by sampling points in two-dimensional or three-dimensional parameter spaces. The experiment generator 155 can determine a stopping condition for the iterative process by evaluating whether predefined calibration targets are met, for example, whether the readout fidelity exceeds a specified threshold or the uncertainty estimate falls below a set percentage. The experiment generator 155 can update the associated uncertainty estimates based on new results 184 and/or measurement data obtained from executing calibration experiments 180. The experiment generator 155 can represent target metrics and uncertainty values as floating point values, vectors, and/or any other suitable data structure indexed by parameter type and/or calibration experiment 180 identifier.

The experiment generator 155 can use the target metric and uncertainty estimates to inform downstream calibration control by generating/selecting corresponding test parameters 182 for suitable calibration experiments 180 to the calibration controller 160 for execution. The experiment generator 155 can update the stored values after each calibration experiment 180 to reflect the most recent results 184 and model predictions. The experiment generator 155 can access the updated target metric and uncertainty values to refine subsequent parameter selection and acquisition function maximization. The experiment generator 155 can maintain a historical record of target metric changes and uncertainty reduction across calibration cycles using results 184. The experiment generator 155 can provide the updated target metric and uncertainty values as input to other calibration processes or monitoring routines.

In some implementations, the experiment generator 155 can determine the target metric based on at least one of a readout fidelity, a qubit frequency drift, a flux position, a qubit decoherence time, or a gate fidelity. The experiment generator 155 can use readout fidelity as a target metric to quantify the probability of correctly distinguishing qubit states, which can be measured by preparing known states and recording measurement assignment probabilities. The experiment generator 155 can use qubit frequency drift as a target metric to represent the deviation of a qubit's resonance frequency from a reference value, which can be measured by performing frequency sweep experiments and extracting the peak response. The experiment generator 155 can use flux position as a target metric to specify the applied magnetic flux bias for a tunable qubit, which can be measured by monitoring the qubit's response to flux bias changes.

The experiment generator 155 can use qubit decoherence time as a target metric to indicate the characteristic timescale for energy relaxation or dephasing, which can be measured from results 184 of T1 or T2 calibration experiments 180. The experiment generator 155 can use gate fidelity as a target metric to quantify the accuracy of single-qubit or two-qubit gate operations, which can be measured by randomized benchmarking or process tomography. The experiment generator 155 can select or update the target metric in response to calibration goals (e.g., when according to a predetermined calibration procedure, in which different metrics are calibrated sequentially and/or in parallel), device performance (e.g., measured results 184 of corresponding calibration experiments 180), and/or operator-specified criteria. The experiment generator 155 can optimize each target metric with a corresponding set of test parameters 182 using the described the Bayesian optimization process to maximize the acquisition function with respect to the selected metric.

The quantum system controller 160 can be a processing component that can generate control instructions 130 to apply test parameters 182 to the quantum processor(s) 122 and executes calibration experiments 180. The quantum system controller 160 can generate control instructions 130 that configure hardware control signals of the control system 124 of the quantum system 120 by generating signal values for drive, flux, and/or readout lines based on the test parameters 182, and can initiate experiment runs by transmitting the generated signal values to the quantum processor(s) 122. The quantum system controller 160 can collect measurement data from the quantum processor(s) 122 during or after each experiment run, for example, by receiving state readouts, error rates, or other telemetry data.

The quantum system controller 160 can receive the measurements (e.g., as telemetry data 125 and/or additional output values) and generate corresponding calibration results 184 for the calibration experiment 180 as structured data records, where each record can include one or more measured values, a reference to the corresponding experiment parameters 182, and a timestamp or experiment identifier. The quantum system controller 160 can update operational parameters for the quantum processor(s) 122 and/or trigger further calibration experiments 180 based on the calibration results 184, for example, by determining whether performance targets have been met or whether additional parameter refinement is required.

The quantum system controller 160 can generate control instructions 130 that specify the hardware signal settings to implement the test parameters 182 for a calibration experiment 180, including but not limited to amplitude, frequency, duration, and/or bias values for drive, flux, and/or readout lines. The control instructions 130 can be formatted as digital command sequences or analog signal definitions, and can be transmitted to the control system 124 via a communication interface or bus. The control system 124 can receive the control instructions 130 and apply the specified signal settings to the quantum processor(s) 122, for example, by configuring waveform generators, bias sources, and/or pulse modulators. The quantum system controller 160 can monitor the execution status of each calibration experiment 180 by receiving feedback or status signals from the control system 124 and can determine whether the experiment completed successfully or whether error conditions were detected. In some implementations, the quantum system controller 160 can issue control instructions 130 in response to the completion of parameter updates, detection of performance drift, or receipt of a calibration trigger from a monitoring process. The quantum system controller 160 can repeat the process of generating control instructions 130, executing calibration experiments 180, and updating calibration results 184 as required to achieve calibration objectives.

The results 184 can be accessed by the experiment generator 155 from storage 115 using identifiers corresponding to calibration experiments 180, parameter types, or associated quantum processor(s) 122. The experiment generator 155 can retrieve measurement outcomes, such as fidelity metrics, error rates, or parameter drift values, and can compare the retrieved results 184 to predefined target metrics for each calibration parameter. The experiment generator 155 can use the techniques described herein to generate additional test parameters 182 for subsequent calibration experiments 180 to optimize target metric(s) for calibration of the quantum processor(s) 122. The experiment generator 155 can determine whether all target metrics have been optimized to a calibrated state by evaluating whether the measured results 184 meet or exceed specified thresholds for each performance metric and/or whether the associated uncertainty estimates fall below a predetermined limit. If any target metric remains unoptimized, the experiment generator 155 can continue generating and selecting new test parameters 182 for subsequent calibration experiments 180 to optimize those target metrics.

Once the test parameters 182 that result in a calibrated state for the quantum processor(s) 122 have been identified, the quantum system controller 160 can generate an updated set of operational parameters for the quantum computing system 120 using the calibration results 184. The updated operational parameters can be represented as structured records or vectors, where each parameter value is associated with a unique identifier, a timestamp, and a reference to the corresponding prior parameter set. In some implementations, the updated set of operational parameters can be a set of parameters identified from the calibration results 184 that result in a calibrated system (e.g., satisfy all target metrics within target threshold(s), etc.). The quantum system controller 160 can store the updated operational parameters in storage 115, indexed by quantum processor identifier and can apply the updated parameters to the quantum processor(s) 122 by transmitting the corresponding values to the appropriate hardware controllers via corresponding control instructions 130. The updated set of operational parameters can include but are not limited to operating parameters for a flux bias, a drive amplitude, a coupler bias, and/or a readout resonator frequency.

The quantum system controller 160 can control the quantum processor(s) 122 according to the updated set of operational parameters using the control instructions 130. In some implementations, the quantum system controller 160 can control the quantum processor(s) 122 according to the updated set of operational parameters by adjusting one or more hardware control signals associated with one or more control lines of the quantum computing system 120, for example, by transmitting control instructions 130 to the control system 124. The quantum system controller 160 can generate control instructions 130 to modify hardware control signals such as voltage, current, or waveform parameters for each control line (e.g., drive, flux, readout lines, etc.). In some implementations, and as described in connection with FIG. 5, the data obtainer 135 can obtain telemetry data 125 once the calibrated operational parameters have been determined, to identify conditions where the quantum processor(s) 122 have become uncalibrated.

In some implementations, the model executor 145 can initiate automatic training or retraining of the graph neural network 150 by generating a training dataset that includes portions of the spatio-temporal graph 170 paired with corresponding operational parameters generated as ground truth during calibration operations. The model executor 145 can access the spatio-temporal graph 170, and can extract, for one or more calibration cycles, a representation of the spatio-temporal graph 170 as input data and a set of updated operational parameters that produced a calibrated state as target output data. The model executor 145 can format each data pair as a tuple that includes a graph structure encoding node features, edge features, and temporal indices, and a vector or set of vectors representing the validated operational parameters applied to the quantum processor(s) 122 during that cycle. In some implementations, the model executor 145 can aggregate multiple such tuples to form a training dataset that reflects spatial and temporal variations in device behavior, as well as effects of parameter drift and hardware changes over time.

The model executor 145 can execute a supervised learning process to improve the predictive accuracy of the graph neural network 150 using the generated training dataset. The model executor 145 can initialize the graph neural network 150 with current weights and provide the training dataset as input, where each input graph structure can be processed to predict calibration parameter ranges, and the predicted outputs can be compared to the operational parameters serving as ground truth using a loss function such as mean squared error or negative log likelihood. The model executor 145 can update the weights of the graph neural network 150 (e.g., using backpropagation, etc.) by applying a gradient-based optimization algorithm, such as stochastic gradient descent or Adam, to minimize the loss across the dataset. In some implementations, the model executor 145 can monitor the prediction error on a validation subset of the dataset and can determine whether retraining is warranted based on a threshold criterion. The model executor 145 can store the retrained graph neural network 150 for deployment in subsequent calibration cycles, such that the data processing system 105 can adapt to changes in device characteristics and operational history over time.

Figure 3:
FIG. 3 is a data flow diagram showing how an example adaptive calibration process can be implemented for quantum processors, in accordance with one or more implementations.
Figure 3:
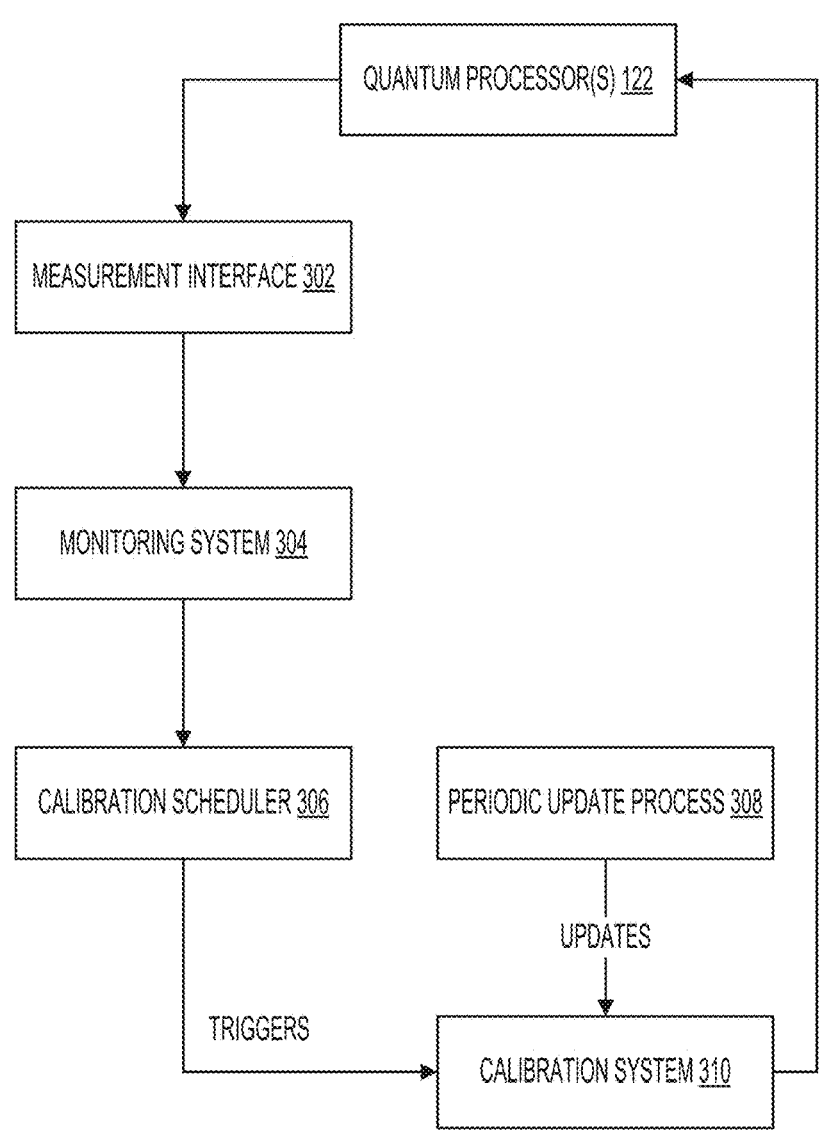

Referring now to FIG. 3, illustrated is a data flow diagram 300 showing how an example adaptive calibration process can be implemented for quantum processors. The data flow diagram 300 can include one or more quantum processors 122, a measurement interface 302, a monitoring system 304, a calibration scheduler 306, a periodic update process 308, and a calibration system 310.

Referring to FIG. 3, illustrated is a data flow diagram 300 depicting an example adaptive calibration process for quantum processors. The data flow diagram 300 can include quantum processor(s) 122, which can generate quantum state data and respond to calibration control signals (e.g., implemented via the quantum processor(s) 122 of FIG. 1). The data flow diagram 300 illustrates a high-level flow of the various adaptive calibration techniques described herein. The measurement interface 302 (e.g., the control system 124, etc.) can obtain measurement data from the quantum processor(s) 122, such as qubit state readouts, operational parameters, or error rates. The measurement interface 302 can transmit the acquired data to the monitoring system 304 (e.g., implemented via the data obtainer 135, the data processing system 105, etc.), which can perform analysis to detect deviations from reference performance metrics (e.g., comparing error rates, decoherence, etc. to predetermined thresholds, etc.). The monitoring system 304 can compare the incoming measurement data to stored calibration baselines and determine whether performance degradation has occurred.

Upon detecting a deviation, the monitoring system 304 can transmit a signal to the calibration scheduler 306 (e.g., implemented using the components of the data processing system 105 as described herein) to initiate a calibration process. The calibration scheduler 306 can initiate calibration operations (e.g., according to predetermined performance degradation thresholds, etc.). The calibration scheduler 306 can transmit a command to the calibration system 310 (e.g., implemented using the data processing system 105, etc.) to begin a calibration sequence, where the calibration system 310 can execute parameter estimation, optimization, and control routines, as described in connection with FIG. 1. The periodic update process 308 can provide updates to the calibration system 310 by supplying accumulated calibration data or retraining information for machine learning models (e.g., the graph neural network 150, etc.). The calibration system 310 can generate updated calibration settings and transmit control instructions to the quantum processor(s) 122 to apply the new parameters, as described herein.

Figure 4:
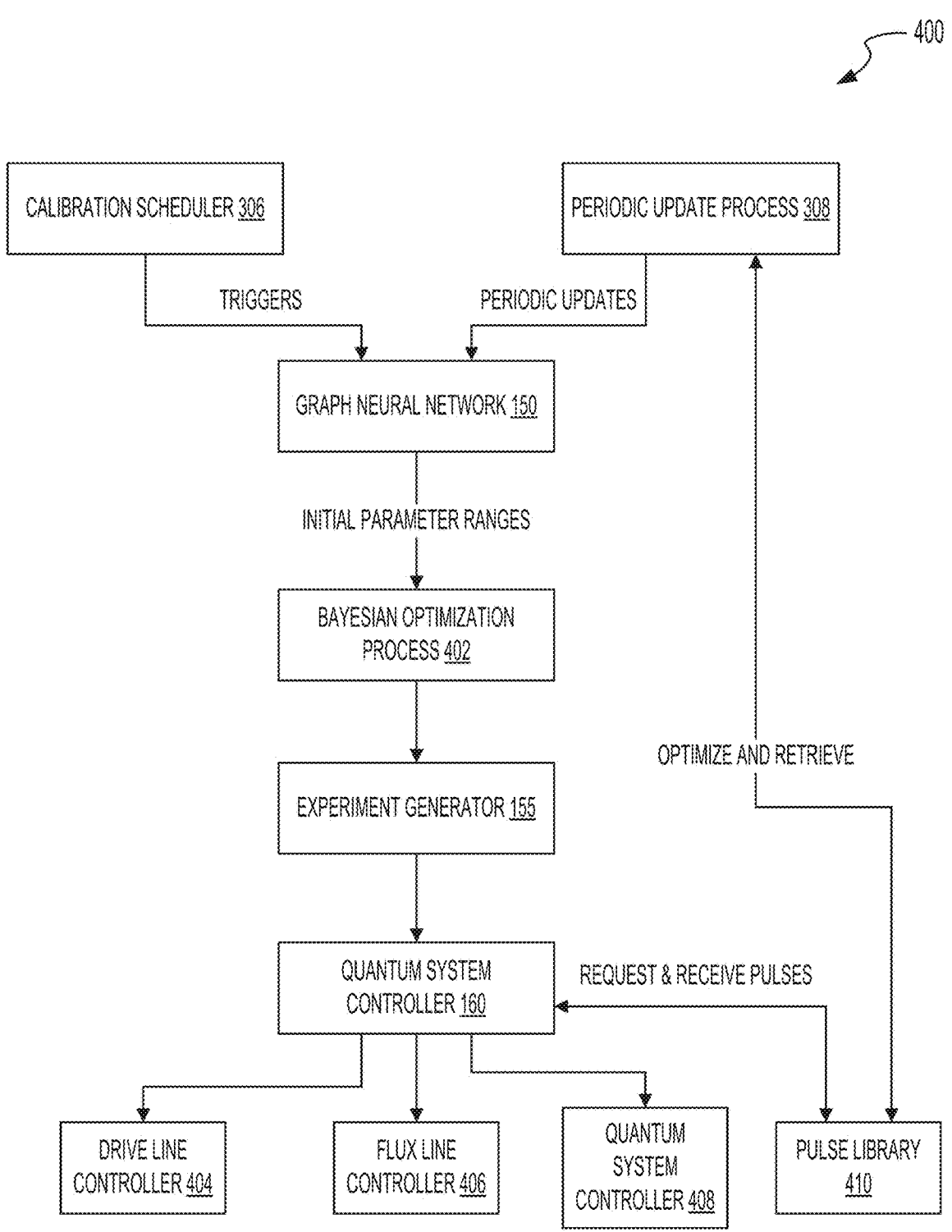
FIG. 4 is a data flow diagram illustrating a process for calibrating quantum computing systems, in accordance with one or more implementations.

Referring now to FIG. 4, illustrated is a data flow diagram 400 depicting a process for calibrating quantum computing systems. The data flow diagram 400 can include a calibration scheduler 306, a periodic update process 308, a graph neural network 150, a Bayesian optimization process 402, an experiment generator 155, a quantum system controller 160, a drive line controller 404, a flux line controller 406, a quantum system controller 408, and a pulse library 410.

The data flow diagram 400 shows the calibration scheduler 306 and a periodic update process 308. The periodic update process 308 can be used to update the graph neural network 150. The calibration scheduler 306 (e.g., implemented by the data processing system 105) can execute/initiate execution of the graph neural network 150 in response to detection of performance degradation, a scheduled calibration event, operator input, and/or any other operator input. The periodic update process 308 (e.g., implemented via the data processing system 105, etc.) can periodically retrain/fine-tune/update the trainable parameters of the graph neural network 150 as described in connection with FIG. 1. As described herein, the graph neural network 150 can generate initial parameter ranges for calibration by processing quantum processor data, such as qubit parameters, device model information, coupling strengths, control line data, measurement history, and metadata, among others, as described in connection with FIG. 3.

The initial parameter ranges generated by the graph neural network 150 can be provided as input to a Bayesian optimization process 402 (e.g., which may be implemented by the experiment generator 155 as described in connection with FIG. 1, etc.), which can refine calibration parameter values (e.g., test parameters 182) using probabilistic modeling techniques (e.g., Gaussian process regression, acquisition function maximization, etc.). The Bayesian optimization process 402 can output refined parameter values to an experiment generator 155, which can select/generate candidate calibration experiments using the generated test parameters for execution. The quantum system controller 160, which can coordinate the application of calibration/test parameters to the quantum processor hardware (e.g., the control system 124). In this example, the quantum system controller 160 can generate control signals for a drive line controller 404, a flux line controller 406, and a quantum system controller 408, each of which can manipulate corresponding hardware channels (e.g., drive, flux, or readout lines, etc.) to apply the selected calibration settings.

The quantum system controller 160 can further request and receive optimized control pulses from a pulse library 410, which can store pulse shapes generated by a control process (e.g., amplitude modulation, phase modulation, temporal duration optimization, etc.). The periodic update process 308 can optimize and retrieve pulse information from the pulse library 410 and provide updated pulse data to the graph neural network 150 for future calibration cycles. In some implementations, the quantum system controller 160 can coordinate with the pulse library 410 to retrieve pulse shapes corresponding to the current hardware configuration, calibration experiments and parameters thereof, and calibration objectives.

Figure 5:
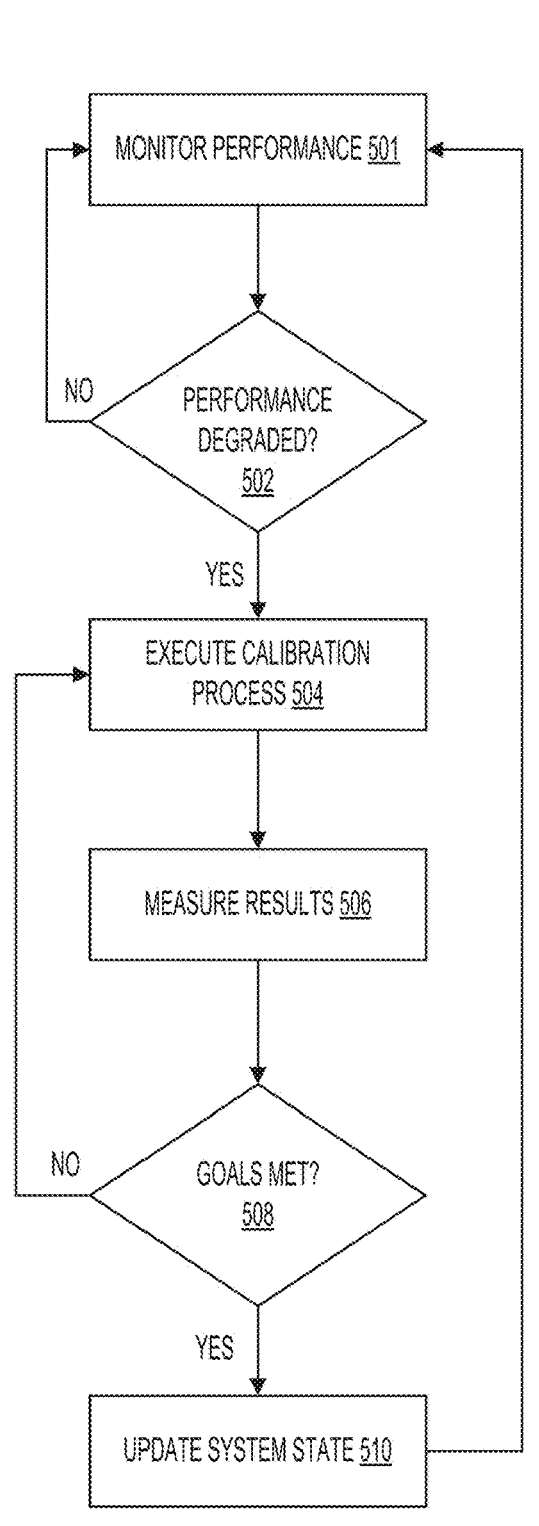
FIG. 5 is a flowchart illustrating an iterative calibration process for a quantum computing system, in accordance with one or more implementations.

Referring now to FIG. 5, illustrated is a method 500 of performing an iterative calibration process for a quantum computing system. The method 500 may be implemented, for example, using the data processing system 105 described in connection with FIG. 1. In brief overview of the method 500, the method 500 can include monitoring system performance (ACT 501), determining whether performance has degraded (ACT 502), executing a calibration process if degradation is detected (ACT 504), measuring the results of the calibration (ACT 506), evaluating whether calibration goals have been met (ACT 508), and updating the system state (ACT 510).

The method 500, at ACT 501, can include monitoring performance of a quantum computing system (e.g., the quantum computing system 120). The monitoring process can include receiving performance measurements (e.g., telemetry data 125) corresponding the quantum processor, such as qubit frequencies, flux bias points, readout fidelities, and/or gate error rates, among others. To do so, any of the operations described in connection with the data obtainer 135 can be performed. The accessed data can include any attribute and/or measurement relating to the quantum computing system and/or the quantum processor(s) thereof. In some implementations, a spatio-temporal graph (e.g., the spatio-temporal graph 170) may be updated according to the received measurements, as described herein.

The method 500, at ACT 502, can include determining whether performance has degraded. The determination process can include evaluating the results of the monitoring process to identify whether any measured metric, such as a qubit frequency, a flux bias value, or a readout fidelity, among others, deviates from its corresponding reference value by more than a predetermined threshold. In some implementations, the determination process can include generating a performance degradation flag if one or more monitored parameters exceed their respective thresholds, and the flag can trigger the initiation of a calibration process. In some implementations, the determination process can include storing an indication of the detected performance degradation in a log or performance history record. If it is determined that performance has degraded, the method 500 can proceed to ACT 504. If performance has not degraded, the method can continue monitoring at ACT 501.

The method 500, at ACT 504, can include executing a calibration process if degradation is detected. To do so, any of the operations described in connection with the model executor 145, the graph neural network 150, the experiment generator 155, and the quantum system controller 160 can be performed. The calibration process can include estimating initial calibration parameters using a spatio-temporal graph neural network (e.g., the graph neural network 150), refining calibration parameters (e.g., test parameters 182) through Bayesian optimization, and generating and performing calibration experiments (e.g., calibration experiments 180). Performing calibration experiments can include applying optimized control pulses to the quantum processor.

The method 500, at ACT 506, can include measuring the results of the calibration experiments. The measurement process can include obtaining measurement data from the quantum processor after application of the candidate calibration parameters, where the measurement data can include qubit state populations, gate fidelities, error rates, parameter drift values, or other operational metrics. The measurement process can include receiving the measurement data from the quantum processor, the control system, and/or other components of the quantum computing system, for example, by acquiring state readouts, timing information, or analog and/or digital signal values generated during or after execution of the calibration experiment. In some implementations, the measurement process can include storing the obtained measurement data in association with the calibration experiment identifier, the parameter set applied during the experiment, and a timestamp, and can include updating a calibration results data structure with the newly obtained measurement data.

The method 500, at ACT 508, can include evaluating whether calibration goals have been met. The evaluation process can include comparing the measured calibration results to predefined performance targets, such as minimum readout fidelity, maximum allowable qubit frequency drift, or target gate error rate, among others, and determining whether all calibration objectives have been satisfied. In some implementations, the evaluation process can include generating an indication of whether further calibration iterations are to be executed. If the calibration goals are not met, the method 500 can return to ACT 504 to perform further optimization of the operational parameters of the quantum computing system. If the calibration goals are met, the method 500 can proceed to ACT 510.

The method 500, at ACT 510, can include updating the system state. Updating the system state can include storing the validated calibration parameters as the current operational parameters (e.g., update calibration parameters) for the quantum processor. In some implementations, updating the system state can include appending the input graph data and validated parameters to a training dataset for periodic retraining of the spatio-temporal graph neural network, as described herein.

Figure 7:
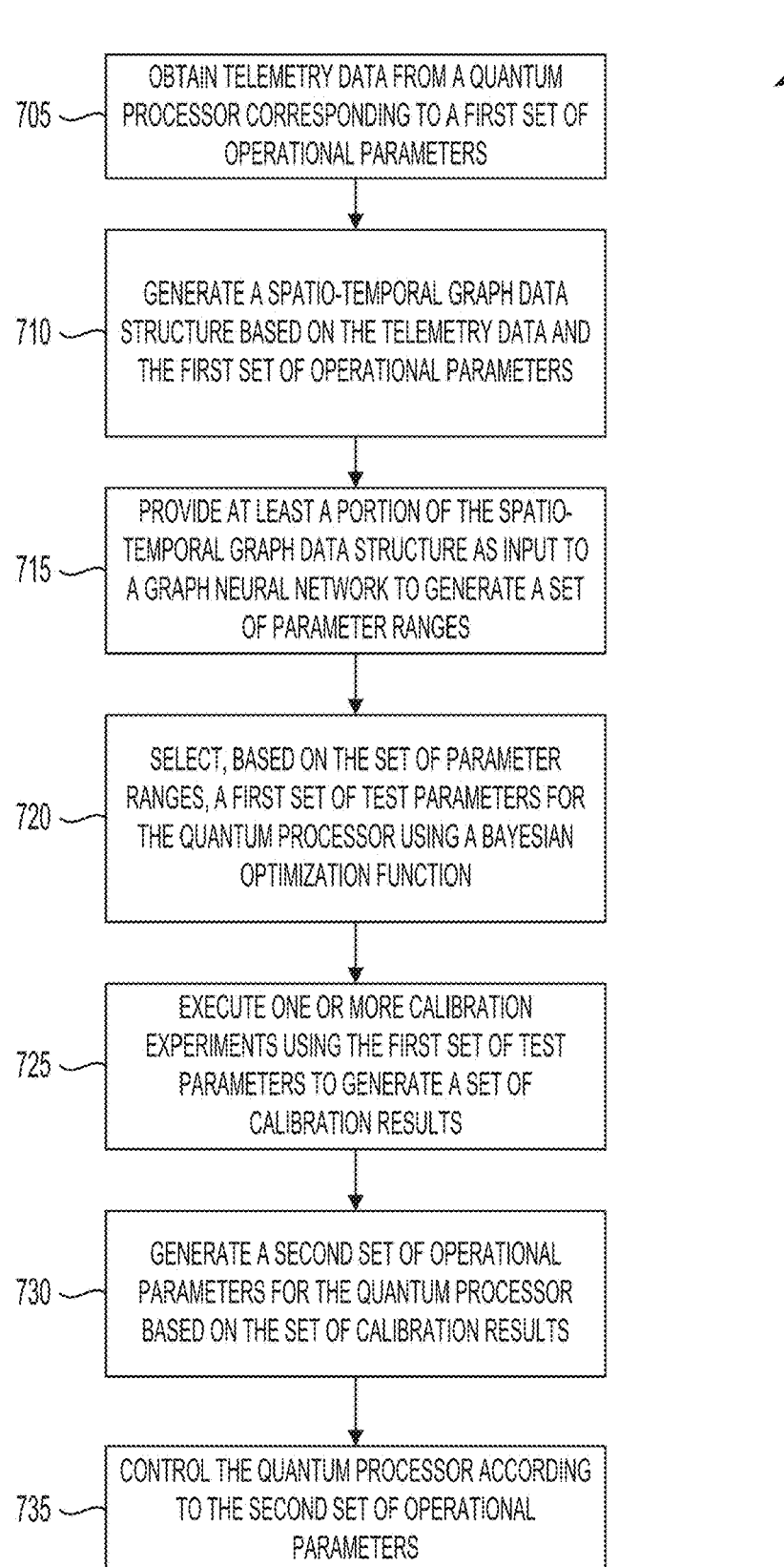
FIG. 7 is a flow chart illustrating a method for adaptive calibration of a quantum computing system, in accordance with one or more implementations.

Referring now to FIG. 7, illustrated is a method 700 of adaptive calibration of a quantum computing system. The method 700 may be performed, for example, by the data processing system 105 of FIG. 1. In brief overview of the method 700, the method 700 can include obtaining telemetry data from a quantum processor corresponding to a first set of operational parameters (ACT 705), generating a spatio-temporal graph data structure based on the telemetry data and the first set of operational parameters (ACT 710), providing at least a portion of the spatio-temporal graph data structure as input to a graph neural network to generate a set of parameter ranges (ACT 715), selecting, based on the set of parameter ranges, a first set of test parameters for the quantum processor using a Bayesian optimization function (ACT 720), executing one or more calibration experiments using the first set of test parameters to generate a set of calibration results (ACT 725), generating a second set of operational parameters for the quantum processor based on the set of calibration results (ACT 730), and controlling the quantum processor according to the second set of operational parameters (ACT 735).

The method 700, at ACT 705, can include obtaining telemetry data (e.g., telemetry data 125) from a quantum processor (e.g., quantum computing system 120, quantum processor(s) 122, etc.) corresponding to a first set of operational parameters. To do so, any of the operations of the data obtainer 135 of FIG. 1 can be performed. The telemetry data can include, for example, a qubit frequency, an anharmonicity value, a readout fidelity value, a gate error rate value, a flux bias value, a drive amplitude value, a qubit type, a qubit fabrication parameter, a coupling strength value, an inter-qubit distance value, a crosstalk coefficient, a two-qubit gate fidelity value, a resonance frequency, or a coupling tunability value, among others. In some implementations, obtaining the telemetry data can include performing probe experiments or lightweight performance measurements during processor idle periods, and comparing the measurement results to stored reference values from a prior calibrated state. In some implementations, the telemetry data can be obtained continuously, periodically, in response to a schedule event, in response to operator input, or in response to a detected deviation in system performance, and can be associated with a specific calibration cycle or operational event.

The method 700, at ACT 710, can include generating a spatio-temporal graph data structure (e.g., the spatio-temporal graph 170, etc.) based on the telemetry data and the first set of operational parameters. To do so, any of the operations of the graph updater 140 of FIG. 1 can be performed. The spatio-temporal graph data structure can represent the quantum processor as a set of nodes corresponding to qubits and/or readout resonators, and a set of edges corresponding to relationships between nodes, such as coupling strength, crosstalk, or shared control lines, among others. In some implementations, generating the spatio-temporal graph can include creating temporal edges that connect nodes corresponding to the same qubit at different time indices, such that the graph encodes both spatial and temporal relationships among device components and operational parameters. The spatio-temporal graph data structure can be generated or updated in response to newly obtained telemetry data, as described herein.

The method 700, at ACT 715, can include providing at least a portion of the spatio-temporal graph data structure as input to a graph neural network (e.g., the graph neural network 150) to generate a set of parameter ranges (e.g., parameter ranges 175). The graph neural network can receive, as input, node and edge features derived from the spatio-temporal graph, including qubit parameters, device model information, coupling strengths, control line data, measurement history, and metadata, among others. The graph neural network can process the input data using graph convolutional layers to aggregate spatial information and temporal convolutional layers to capture parameter drift and dynamic changes, for example, as described in connection with FIGS. 2 and 6. The graph neural network can generate, as output, a set of parameter ranges for operation of the quantum processor, uncertainty estimates associated with the parameter ranges, and initial pulse shapes for control operations.

The method 700, at ACT 720, can include selecting, based on the set of parameter ranges, a first set of test parameters (e.g., test parameters 182) for the quantum processor using a Bayesian optimization function. To do so, any of the operations of the experiment generator 155 can be performed. The Bayesian optimization function can use a probabilistic model, such as a Gaussian process regression model, to represent the relationship between candidate parameter values and a target performance metric, for example, readout fidelity, qubit frequency drift, flux position, qubit decoherence time, or gate fidelity, among others. The Bayesian optimization function can be used to select the first set of test parameters by maximizing an acquisition function that incorporates both predicted performance and uncertainty estimates, and can update the probabilistic model after each experiment based on measured results, as described herein. In some implementations, the Bayesian optimization function can be used to select test parameters for multiple control channels, such as drive, flux, and readout lines, and can sequence updates to maintain consistent calibration across interdependent channels.

The method 700, at ACT 725, can include executing one or more calibration experiments using the first set of test parameters to generate a set of calibration results. To do so, any of the operations of the experiment generator 155 and/or the quantum system controller 160 can be performed. Executing the calibration experiments can include varying a control parameter of the first set of test parameters for a plurality of experiment runs, applying the selected parameter values to the quantum processor, and measuring the resulting performance metrics. In some implementations, executing the calibration experiments can include applying control pulses according to the test parameters, and evaluating the performance of the pulses using defined metrics. The calibration results can include measured values such as fidelity metrics, error rates, parameter drift values, and/or other operational outcomes, and can be stored in association with the corresponding test parameters and experiment identifiers.

The method 700, at ACT 730, can include generating a second set of operational parameters for the quantum processor based on the set of calibration results. To do so, any of the operations of the quantum system controller 160 can be performed. Generating the second set of operational parameters can include updating at least one of a flux bias, a drive amplitude, a coupler bias, or a readout resonator frequency parameter according to the calibration results, and storing the updated operational parameters as the current parameter set for the quantum processor. In some implementations, generating the second set of operational parameters can include archiving the calibration results and associated parameter sets for future reference and/or retraining of the graph neural network, as described in connection with FIG. 1.

The method 700, at ACT 735, can include controlling the quantum processor according to the second set of operational parameters. Controlling the quantum processor can include adjusting one or more hardware control signals associated with one or more control lines of the quantum processor, for example, by applying the updated operational parameters to drive, flux, or readout line controllers. In some implementations, controlling the quantum processor can include performing verification measurements to confirm that the updated operational parameters achieve the desired calibration objectives, and can include obtaining second telemetry data during operation using the second set of operational parameters and updating the spatio-temporal graph data structure based on the second telemetry data.

Figure 8:
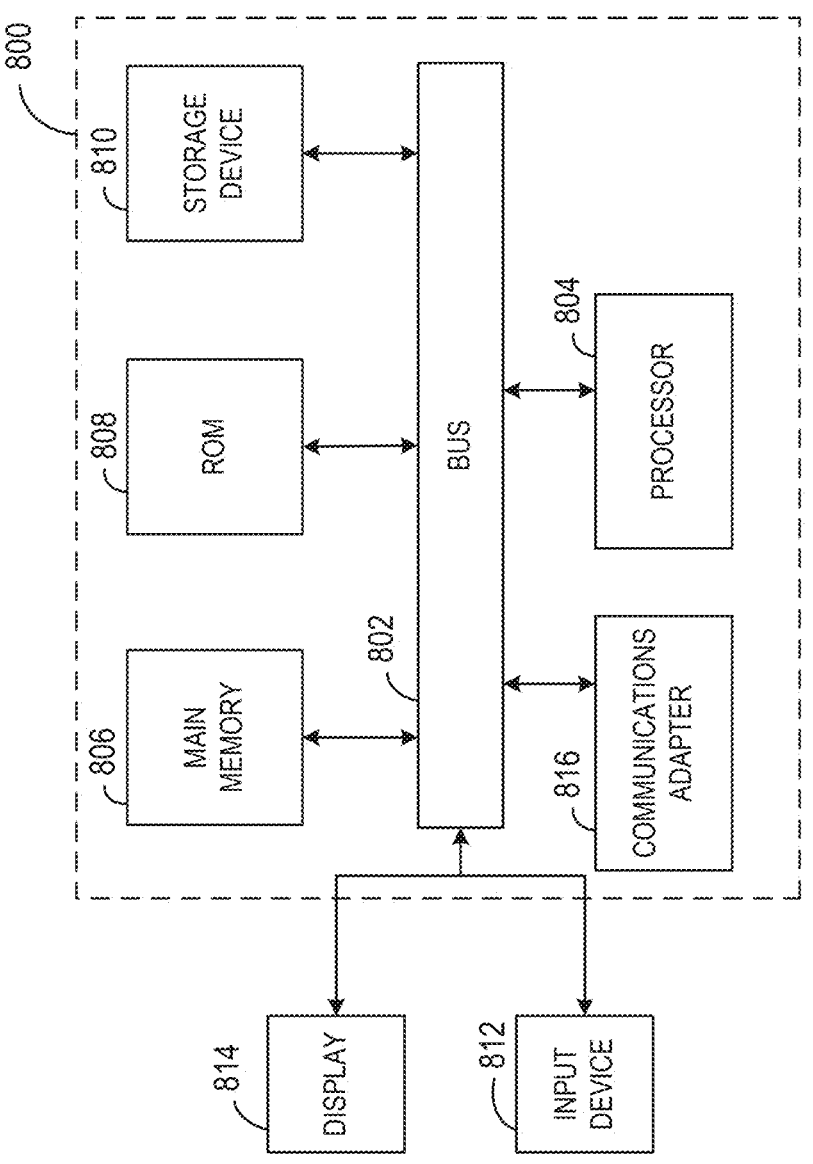
FIG. 8 illustrates a block diagram of an example computing system suitable for use in the various arrangements described herein, in accordance with one or more implementations.

FIG. 8 is a component diagram of an example computing system suitable for use in the various implementations described herein, according to an example implementation. For example, the computing system 800 may implement the data processing system 105, the classical computing system 928, or various other example systems and devices described in the present disclosure.

The computing system 800 includes a bus 802 or other communication component for communicating information and a processor 804 coupled to the bus 802 for processing information. The computing system 800 also includes main memory 806, such as a RAM or other dynamic storage device, coupled to the bus 802 for storing information, and instructions to be executed by the processor 804. Main memory 806 can also be used for storing position information, temporary variables, or other intermediate information during execution of instructions by the processor 804. The computing system 800 may further include a ROM 808 or other static storage device coupled to the bus 802 for storing static information and instructions for the processor 804. A storage device 810, such as a solid-state device, magnetic disk, or optical disk, is coupled to the bus 802 for persistently storing information and instructions.

The computing system 800 may be coupled via the bus 802 to a display 814, such as a liquid crystal display, or active-matrix display, for displaying information to a user. An input device 812, such as a keyboard including alphanumeric and other keys, may be coupled to the bus 802 for communicating information, and command selections to the processor 804. In another implementation, the input device 812 has a touch screen display. The input device 812 can include any type of biometric sensor, or a cursor control, such as a mouse, a trackball, or cursor direction keys, for communicating direction information and command selections to the processor 804 and for controlling cursor movement on the display 814.

In some implementations, the computing system 800 may include a communications adapter 816, such as a networking adapter. Communications adapter 816 may be coupled to bus 802 and may be configured to enable communications with a computing or communications network or other computing systems. In various illustrative implementations, any type of networking configuration may be achieved using communications adapter 816, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 800 in response to the processor 804 executing an implementation of instructions contained in main memory 806. Such instructions can be read into main memory 806 from another computer-readable medium, such as the storage device 810. Execution of the implementation of instructions contained in main memory 806 causes the computing system 800 to perform the illustrative processes described herein. One or more processors in a multi-processing implementation may also be employed to execute the instructions contained in main memory 806. In alternative implementations, hard-wired circuitry may be used in place of or in combination with software instructions to implement illustrative implementations. Thus, implementations are not limited to any specific combination of hardware circuitry and software.

Figure 9:
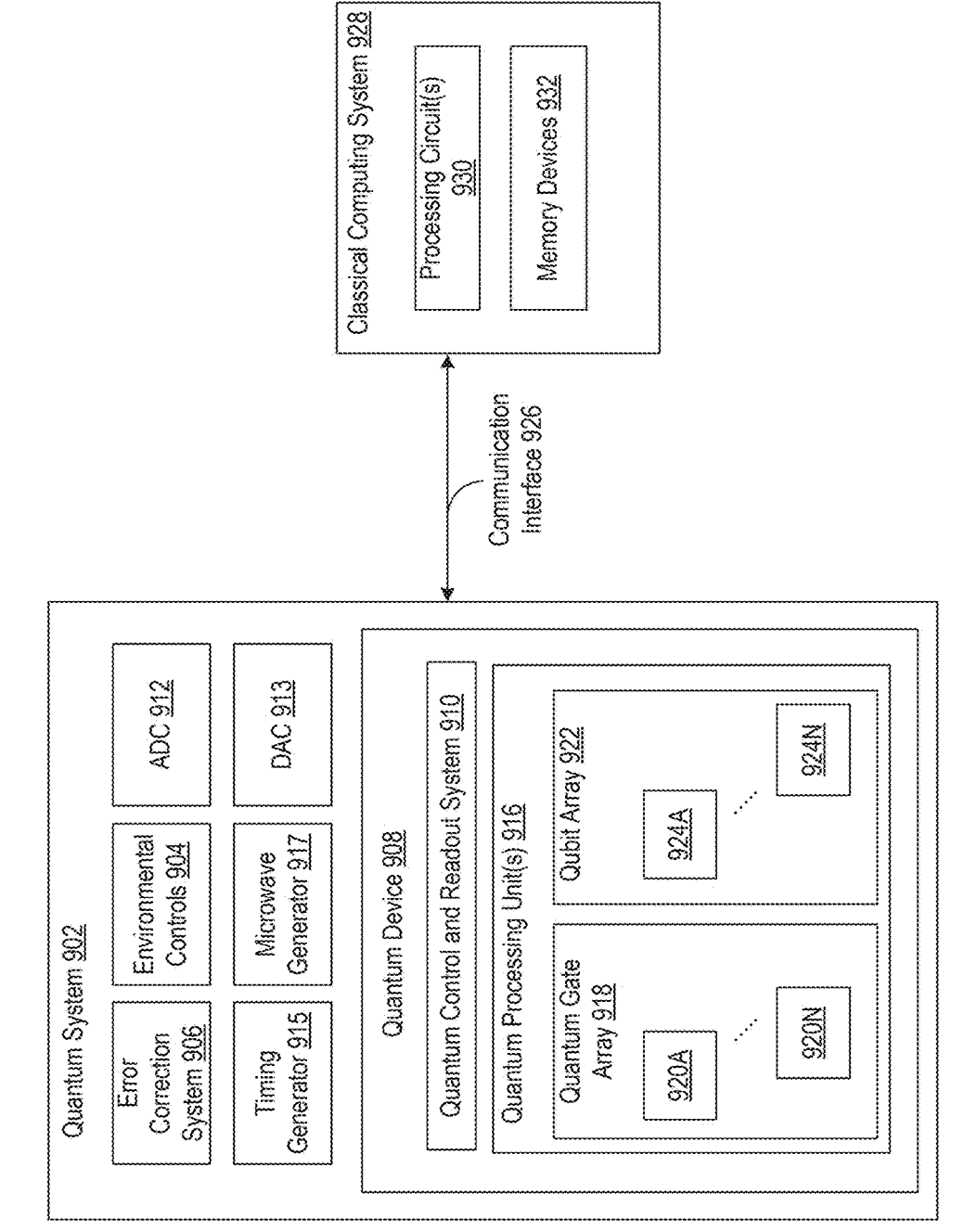
FIG. 9 is a block diagram illustrating an example quantum computing system architecture including quantum and classical subsystems, in accordance with one or more implementations.

Referring now to FIG. 9, illustrated is a block diagram of an example quantum system 900 including a quantum system 902 integrated with a classical computing system 928, in accordance with one or more implementations. The quantum system 902 can include environmental controls 904, a quantum error correction system 906, at least one analog-to-digital converter 912, at least one digital-to-analog converter 913, a timing generator 915, a microwave generator 917, and at least one quantum device 908, at least one quantum control and readout system 910, at least one quantum processing unit 916, at least one quantum gate array 918, one or more quantum gate elements 920A-920N, at least one qubit array 922, and one or more qubits 924A-924N. The system 900 can further include at least one communication interface 926. The system 900 can include a computing system 928, which can include one or more processing circuits 330 and one or more memory devices 932.

The system 900 or portions thereof may be provided in a controlled environment. For example, the ambient environment can correspond to a controlled environment having an ambient temperature near room temperature (e.g., 60 degrees Fahrenheit (° F.) to 80° F.) The ambient environment is not limited to the range of room temperatures. For example, the ambient environment of the qubit array 922 can correspond to an environment having a temperature within the range of 0 Kelvin (K) to 90 K, corresponding to a superconducting temperature ambient environment.

The classical computing system 928 can include at least one processor and a memory (e.g., a processing circuit). The memory can store processor-executable instructions that, when executed by processor(s), cause the processor(s) to perform one or more of the operations described herein. The processing circuit(s) 930 may include a general-purpose processor (e.g., a CPU, etc.), an ASIC, a GPU, a TPU, an FPGA, the like, or combinations thereof. The memory may include, but is not limited to, electronic, optical, magnetic, or any other storage or transmission device capable of providing the processor with program instructions. The memory devices 932 may further include a high-speed memory devices (e.g., high-bandwidth memory devices, high-bandwidth RAM/VRAM, etc.), memory chips, ASIC, FPGA, ROM, RAM, EEPROM, EPROM, flash memory, optical media, and/or any other suitable memory from which the processor(s) can read instructions and/or data. The instructions may include code from any suitable computer programming language. The classical computing system 928 can include one or more computing devices or servers that can perform various functions as described herein. The classical computing system 928 can include any or all of the components and perform any or all of the functions of any computing system described herein.

The quantum computing system 900 can include at least one communication interface 926. The communication interface 926 can be used to exchange information between components of the quantum system 902 and the classical computing system 928. The communication interface 926 can facilitate the transmission of instructions, signals, status information, conditions, states, and any other information necessary for coordinating tasks and operations across the quantum and classical subsystems. This interface can include one or more digital, analog, or similar communication channels, designed to support interaction. The communication interface 926 can include all connections, protocols, and supporting hardware or software to implement communication between the classical and quantum parts of the system, allowing for hybrid computational workflows.

The quantum computing system 900 can include the quantum system 902. The quantum system 902 can be configured to provide the physical infrastructure necessary for quantum information processing and execution of quantum algorithms. The quantum system 902 can include components and subsystems required to support quantum operations and establish the proper physical environment for the operation of quantum processing elements. In some implementations, the quantum system 902 can be coupled to the environmental controls 904 and the quantum error correction system 906 to maintain appropriate operational conditions and support reliable quantum circuit execution. The quantum system 902 can interoperate with the quantum control and readout system 910 and can be interfaced, via the communication interface 926, with the classical computing system 928. The quantum system 902 can include one or more environmental controls 904.

The quantum system 902 can include one or more environmental controls 904. The environmental controls 904 can be configured to maintain precise physical conditions necessary for stable and reliable quantum operations. The environmental controls 904 can comprise a range of subsystems designed to regulate factors such as temperature, pressure, humidity, magnetic fields, electromagnetic interference, and radiation, all of which can affect the performance and coherence time of quantum devices. For example, in superconducting quantum processors, environmental controls 904 can include cryogenic refrigeration units or dilution refrigerators that cool the quantum hardware to millikelvin temperatures to enable superconductivity and minimize thermal noise. In trapped ion or neutral atom systems, environmental controls 904 can encompass vacuum chambers to minimize atomic collisions and laser stabilization systems to control various optical devices.

In some implementations, in addition to temperature and pressure regulation, the environmental controls 904 can incorporate active magnetic shielding to prevent external fields from disturbing qubit operations, as well as vibration isolation platforms to reduce mechanical noise. These control systems may be controlled by controllers or integrated electronics. The integration of environmental controls 904 within the quantum system 902 can support achieving low error rates and consistent quantum circuit execution in the quantum computing system 900.

The quantum system 902 can include a quantum error correction system 906. The quantum error correction system 906 can be a system configured to detect and correct errors arising during quantum computation or storage. The quantum error correction system 906 can consist of dedicated circuits, hardware modules, or physical subsystems, as well as supporting software, that are designed to implement error correction protocols, such as surface codes, concatenated codes, or other stabilizer codes, in order to preserve the fidelity of quantum states and protect against decoherence, gate errors, or environmental noise. Hardware suitable for quantum error correction can encompass ancillary qubits, syndrome measurement circuits, control electronics, and real-time feedback systems, while error correction software can execute operations for syndrome extraction, error diagnosis, and corrective feedback. In some implementations, the quantum error correction system 906 can include cryogenic controllers, programmable logic devices, and/or firmware to facilitate the detection and correction of quantum errors.

The analog-to-digital converter 912 can receive analog measurement signals generated by the quantum control and readout system 910 and can convert the received analog signals into corresponding digital data. The analog-to-digital converter 912 can sample the analog input at a predetermined rate and can generate digital output values that represent the amplitude or phase of the measurement signal at each sample point. In some implementations, the analog-to-digital converter 912 can store the generated digital data in memory devices 932 or can transmit the digital data to the classical computing system 928 for subsequent processing, storage, or calibration analysis.

The digital-to-analog converter 913 can receive digital control data from the classical computing system 928 or the quantum control and readout system 910 and can convert the received digital data into corresponding analog control signals. The digital-to-analog converter 913 can generate analog voltage or current signals that are applied to the quantum processing unit 916 to implement control operations such as qubit drive, flux bias, or readout pulse generation. In some implementations, the digital-to-analog converter 913 can adjust the amplitude, frequency, or phase of the analog output according to the digital input values of the control and readout system 910.

The timing generator 915 can generate timing reference signals that coordinate the operation of the quantum processing unit 916, the quantum control and readout system 910, and the classical computing system 928. The timing generator 915 can produce clock signals, trigger pulses, or synchronization markers that define the timing of control pulses, measurement windows, or calibration experiments. In some implementations, the timing generator 915 can store timing configuration data in memory devices 932 or can receive timing instructions to align calibration operations with processor activity.

The microwave generator 917 can generate microwave signals used to implement control pulses for qubit operations in the quantum processing unit 916. The microwave generator 917 can produce signals at specified frequencies, amplitudes, and phases according to control instructions received from the classical computing system 928 or the calibration controller. In some implementations, the microwave generator 917 can modulate the generated signals to produce shaped pulses for gate operations, readout, or calibration experiments, and can transmit the microwave signals to the quantum processing unit 916 via a drive line controller or other signal routing hardware.

The quantum system 902 can include at least one quantum device 908. The quantum device 908 can be configured to perform quantum computations by executing quantum circuits and manipulating quantum information. The quantum device 908 can serve as the primary computational element within the quantum system 902, orchestrating the application of quantum gates, qubit operations, and measurement processes required by quantum algorithms. The quantum device 908 can be composed of specialized physical subsystems, such as superconducting resonators, trapped-ion arrays, photonic circuits, semiconductor quantum dots, neutral atom arrays, topological qubits, or other device architectures capable of realizing and controlling qubit states. In some implementations, the quantum device 908 can interact with quantum control and readout system 910 to receive gate instructions, perform operations at the hardware level, and provide measurement results to the classical computing system 928. The quantum device 908 can also be integrated with the quantum error correction system 906, the quantum memory 914, and the quantum gate array 918 within the quantum system 902 to enable reliable, high-fidelity execution of quantum algorithms in the quantum computing system 900.

The quantum device 908 can include a quantum control and readout system 910. The quantum control and readout system 910 can manipulate and measure quantum states within the quantum system 902. The quantum control and readout system 910 can generate and deliver control signals, such as microwave pulses, laser fields, or voltage pulses, by receiving timing references from the timing generator 915, analog signals from the digital-to-analog converter 913, and microwave signals from the microwave generator 917. The quantum control and readout system 910 can facilitate the implementation of quantum gates, entanglement protocols, and qubit initialization necessary for quantum algorithm execution by coordinating the sequencing and timing of control pulses with the timing generator 915. The quantum control and readout system 910 can coordinate the timing and sequencing of these operations with high precision via the other components of the quantum system 902. In some implementations, the quantum control and readout system 910 can receive digital control data from the classical computing system 928, convert the data to analog signals using the digital-to-analog converter 913, and deliver the resulting pulses to the quantum device 908. In addition, the quantum control and readout system 910 may facilitate qubit initialization to specified states (e.g., $|0\rangle$, $|+\rangle$), as well as the measurement of specific qubits or quantum registers, such as the most significant qubits or all relevant outputs, measuring expectation values, bitstring outcomes, or the full quantum register state.

In addition to control, the quantum control and readout system 910 can perform high-fidelity measurement and readout of qubit states, converting quantum information into classical data that can be further processed by the classical computing system 928. The measurement systems can vary by technology, including, but not limited to, microwave resonators, lasers, photonic, or single-photon detectors. The quantum control and readout system 910 can receive analog measurement signals from the quantum device 908, amplify and filter the signals, and digitize the measurement data using the analog-to-digital converter 912 to obtain accurate and reliable state information following quantum operations or quantum circuit execution. The quantum control and readout system 910 can interface with the classical control electronics 932 to facilitate the transfer of measurement results and control data between quantum and classical subsystems.

The quantum device 908 can include at least one quantum processing unit 916. The quantum processing unit 916 can include a logical or physical arrangement of quantum gates and qubits designed to execute specific quantum algorithms or operations. The quantum processing unit 916 can define the sequence and connectivity of quantum gate elements, such as single-qubit operations or multi-qubit entangling operations, which act on the qubit array 922 to manipulate quantum states according to a task. The configuration and parameters of the quantum processing unit 916 can include operational parameters or specific gate configurations.

The quantum processing unit 916 can include one or more qubits 924A-924N. The qubits 924 can function as the fundamental units of quantum information, each capable of being realized using various quantum technologies. The qubits 924 can be implemented using superconducting circuits, trapped ions, photonic platforms, semiconductor quantum dots, neutral atom arrays, or other physical systems. The qubits 924 can be initialized to a specific state, such as $|0\rangle$ or $|1\rangle$, a point on a Bloch sphere, or to other suitable state such as $|+\rangle$ or $|-\rangle$. The qubits 924 can also be prepared in a superposition of these states, such as $|\psi\rangle = \alpha|0\rangle + \beta|1\rangle$, where $\alpha$ and $\beta$ represent amplitudes. The qubits 924 can exist in standalone states or in entangled states with other qubits. Other characteristics of the qubits, such as coherence time, control fidelity, and error rates, can influence the execution of quantum operations and the design of error correction protocols.

The qubit 924 can store information in various forms, such as a state vector, density matrix, or probability distribution. The qubit 924 can support representation in multiple bases including, but not limited to, Z or computational, X or Hadamard, or Pauli-Y bases. A system of qubits can collectively represent the state of the quantum circuit, including configurations for advanced algorithms. In some implementations, during quantum processing, qubits in superposed and entangled states can exist and be manipulated via quantum gates. In some implementations, measurement of one or more qubits (e.g., qubits in a superposition state) by the measurement system will collapse the qubit into a defined state following the principles of quantum mechanics including wave function collapse and the observer effect.

The measurement and sometimes collapse of a qubit state can result in a quantum state that is available for classical or further quantum processing.

The quantum processing unit 916 can include at least one qubit array 922 composed of one or more qubits 924A-924N. The qubit array 922 can be organized into one or more quantum registers. Each quantum register can serve as a collection of qubits for computation, storage, or manipulation within the quantum processing unit 916. Quantum registers and/or qubits in the qubit array 922 can be actively addressed and controlled by the quantum gate array 918 and associated gate elements 920A-920N during the execution of quantum algorithms, facilitating various computational tasks. In some implementations, the quantum memory 914 may be used in conjunction with the qubit array 922 to store the state of quantum registers at various points, such as when not actively in use. In some implementations, the qubit array 922 can store a quantum state and can be prepared in various basis states or superpositions in accordance with principles of quantum mechanics. Each qubit in the array can support initialization to specific states and may be configured to store any representation of a quantum state, such as a probability distribution, vector, or density matrix.

The quantum processing unit 916 can include one or more quantum gate elements 920A-920N in at least one quantum gate array 918. The quantum gate elements 920 can implement various quantum operations. For example, the quantum gate elements 920 can include single-input quantum gates, such as Pauli-X (X), Pauli-Y (Y), Pauli-Z (Z), Hadamard (H), T, or RY/RZ rotation gate, as well as multiple-input gates like the controlled-NOT (CNOT) gates. Each quantum gate element can correspond to any quantum operator required by the circuit and may function in accordance with stored or received instructions. The gate elements 920 can act on entangled or non-entangled qubits, support the formation of quantum registers, and be dynamically grouped as required by the algorithm.

The quantum gates elements 920 can be physically realized through precise manipulations of qubits tailored to the specific hardware platform. For example, in superconducting qubit systems, gates can be implemented using microwave pulses to drive transitions between qubit states. Other possible physical realizations of gates, not limited to these, include the use of laser pulses in trapped-ion systems, beam splitters for photonic qubits, and the control of magnetic or electric fields in spin or semiconductor qubit systems. Beyond their direct function in quantum state manipulation, the quantum gate elements 920A-920N may also structurally include or be associated with additional logic circuits, electronic devices, and memory and may be composed in alignment with the specific connectivity and architecture of the quantum hardware in use. Any supporting devices such as interface electronics, memory, and control circuitry can be included within the quantum gate elements or the broader quantum gate array 918 to support quantum gate operations.

The quantum gate array 918 can include a set of one or more quantum gate elements 920A-920N. The quantum gate array 918 can be configured to perform a variety of quantum operations as required by algorithms executed within the quantum processing unit 916. The quantum gate array 918 can be designed to match and connect with the underlying connectivity of the quantum processing unit (QPU), such that physical and logical gate operations are compatible with available qubit arrangements and connectivity. The quantum gate array 918 can provide a mechanism for applying specified transformations to qubit states according to the quantum algorithm being executed, such as for encoding, data classification, or other computational tasks. The configuration and operation of the quantum gate array 918 can be controlled by various components described herein, such as the quantum control and readout system 910.

At least one aspect relates to a system. The system can include one or more processors coupled to non-transitory memory. The system can obtain telemetry data from a quantum processor of a quantum computing system, where the telemetry data corresponds to a first set of operational parameters. The system can generate a spatio-temporal graph data structure based on the telemetry data and the first set of operational parameters, where a set of nodes of the spatio-temporal graph data structure correspond to a set of qubits of the quantum processor. The spatio-temporal graph data structure can include a first set of edges corresponding to spatial relationships between the set of qubits, and a second set of edges corresponding to temporal relationships between the set of nodes. The system can provide at least a portion of the spatio-temporal graph data structure as input to a graph neural network to generate a set of parameter ranges for operation of the quantum processor. The system can select, based on the set of parameter ranges, a first set of test parameters for the quantum computing system using a Bayesian optimization function. The system can execute one or more calibration experiments using the first set of test parameters to generate a set of calibration results. The system can generate a second set of operational parameters for the quantum computing system based on the set of calibration results. The system can control the quantum processor according to the second set of operational parameters.

In some implementations, the spatio-temporal graph can include at least one edge corresponding to a relationship between two of the set of nodes. In some implementations, the telemetry data can include at least one of a qubit frequency, an anharmonicity value, a readout fidelity value, a gate error rate value, a flux bias value, a drive amplitude value, a qubit type, a qubit fabrication parameter, a coupling strength value, an inter-qubit distance value, a crosstalk coefficient, a two-qubit gate fidelity value, a resonance frequency, or a coupling tunability value.

In some implementations, the system can generate the spatio-temporal graph by creating temporal edges connecting nodes corresponding to the same qubit at different time indices. In some implementations, the system can select the first set of test parameters by applying the Bayesian optimization function based on a target metric and an uncertainty estimate associated with the target metric. In some implementations, the system can determine the target metric based on at least one of a readout fidelity, a qubit frequency drift, a flux position, a qubit decoherence time, or a gate fidelity. In some implementations, the system can execute the one or more calibration experiments by varying a control parameter of the first set of test parameters for a plurality of experiment runs.

In some implementations, the system can generate the second set of operational parameters by updating at least one of a flux bias, a drive amplitude, a coupler bias, or a readout resonator frequency according to the set of calibration results. In some implementations, the system can obtain second telemetry data from the quantum processor during operation using the second set of operational parameters, and update the spatio-temporal graph data structure based on the second telemetry data. In some implementations, the system can control the quantum processor according to the second set of operational parameters by adjusting one or more hardware control signals associated with one or more control lines of the quantum computing system.

At least one other aspect relates to a method. The method can be performed, for example, by one or more processors coupled to non-transitory memory. The method can include obtaining telemetry data from a quantum processor of a quantum computing system, where the telemetry corresponds to a first set of operational parameters. The method can include generating a spatio-temporal graph data structure based on the telemetry data and the first set of operational parameters, where a set of nodes of the spatio-temporal graph data structure respectively correspond to a set of qubits of the quantum processor. The spatio-temporal graph data structure can include a first set of edges corresponding to spatial relationships between the set of qubits, and a second set of edges corresponding to temporal relationships between the set of nodes. The method can include providing at least a portion of the spatio-temporal graph data structure as input to a graph neural network to generate a set of parameter ranges for operation of the quantum processor. The method can include selecting, based on the set of parameter ranges, a first set of test parameters for the quantum computing system using a Bayesian optimization function. The method can include executing one or more calibration experiments using the first set of test parameters to generate a set of calibration results. The method can include generating a second set of operational parameters for the quantum computing system based on the set of calibration results. The method can include controlling the quantum processor according to the second set of operational parameters.

In some implementations, the spatio-temporal graph can include at least one edge corresponding to a relationship between two of the set of nodes. In some implementations, the telemetry data can include at least one of a qubit frequency, an anharmonicity value, a readout fidelity value, a gate error rate value, a flux bias value, a drive amplitude value, a qubit type, a qubit fabrication parameter, a coupling strength value, an inter-qubit distance value, a crosstalk coefficient, a two-qubit gate fidelity value, a resonance frequency, or a coupling tunability value. In some implementations, the method can include generating the spatio-temporal graph by creating temporal edges connecting nodes corresponding to the same qubit at different time indices.

In some implementations, the method can include selecting the first set of test parameters by applying the Bayesian optimization function based on a target metric and an uncertainty estimate associated with the target metric. In some implementations, the method can include determining the target metric based on at least one of a readout fidelity, a qubit frequency drift, a flux position, a qubit decoherence time, or a gate fidelity. In some implementations, the method can include executing the one or more calibration experiments by varying a control parameter of the first set of test parameters for a plurality of experiment runs.

In some implementations, the method can include generating the second set of operational parameters by updating at least one of a flux bias, a drive amplitude, a coupler bias, or a readout resonator frequency according to the set of calibration results. In some implementations, the method can include obtaining second telemetry data from the quantum processor during operation using the second set of operational parameters, and updating the spatio-temporal graph data structure based on the second telemetry data. In some implementations, the method can include controlling the quantum processor according to the second set of operational parameters by adjusting one or more hardware control signals associated with one or more control lines of the quantum computing system.

At least one other aspect relates to a non-transitory computer-readable medium storing instructions that, when executed, cause one or more processors coupled to non-transitory memory to perform operations. The operations can include obtaining telemetry data from a quantum processor of a quantum computing system, the telemetry corresponding to a first set of operational parameters. The operations can include generating a spatio-temporal graph data structure based on the telemetry data and the first set of operational parameters, wherein a set of nodes of the spatio-temporal graph data structure respectively correspond to a set of qubits of the quantum processor. The spatio-temporal graph data structure can include a first set of edges corresponding to spatial relationships between the set of qubits, and a second set of edges corresponding to temporal relationships between the set of nodes. The operations can include providing at least a portion of the spatio-temporal graph data structure as input to a graph neural network to generate a set of parameter ranges for operation of the quantum processor. The operations can include selecting, based on the set of parameter ranges, a first set of test parameters for the quantum computing system using a Bayesian optimization function. The operations can include executing one or more calibration experiments using the first set of test parameters to generate a set of calibration results. The operations can include generating a second set of operational parameters for the quantum computing system based on the set of calibration results. The operations can include controlling the quantum processor according to the second set of operational parameters.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more general-purpose processors, ASICs, FPGAS, GPUs, TPUs, digital signal processors (DSPs), or other suitable electronic data processing components structured to execute instructions provided by memory. The one or more processors may take the form of a single core processor, multi-core processor (e.g., a dual core processor, triple core processor, or quad core processor), microprocessor, etc. In some implementations, the one or more processors may be external to the apparatus, for example, the one or more processors may be a remote processor (e.g., a cloud-based processor). Alternatively or additionally, the one or more processors may be internal or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data, which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

What is claimed is:

1. A system, comprising:
   one or more processors coupled to non-transitory memory, the one or more processors configured to:
      obtain telemetry data from a quantum processor of a quantum computing system, the telemetry data corresponding to a first set of operational parameters;
      generate a spatio-temporal graph data structure based on the telemetry data and the first set of operational parameters, wherein a set of nodes of the spatio-temporal graph data structure correspond to a set of qubits of the quantum processor, the spatio-temporal graph data structure comprising (i) a first set of edges corresponding to spatial relationships between the set of qubits, and (ii) a second set of edges corresponding to temporal relationships between the set of nodes;
      provide at least a portion of the spatio-temporal graph data structure as input to a graph neural network (GNN) to generate a set of parameter ranges for operation of the quantum processor;
      select, based on the set of parameter ranges, a first set of test parameters for the quantum computing system using a Bayesian optimization function;
      execute one or more calibration experiments using the first set of test parameters to generate a set of calibration results;
      generate a second set of operational parameters for the quantum computing system based on the set of calibration results; and
      control the quantum processor according to the second set of operational parameters.

2. The system of claim 1, wherein the spatio-temporal graph comprises at least one edge corresponding to a relationship between two of the set of nodes.

3. The system of claim 1, wherein the telemetry data comprises at least one of a qubit frequency, an anharmonicity value, a readout fidelity value, a gate error rate value, a flux bias value, a drive amplitude value, a qubit type, a qubit fabrication parameter, a coupling strength value, an inter-qubit distance value, a crosstalk coefficient, a two-qubit gate fidelity value, a resonance frequency, or a coupling tunability value.

4. The system of claim 1, wherein the one or more processors are further configured to:
   generate the spatio-temporal graph by creating temporal edges connecting nodes corresponding to the same qubit at different time indices.

5. The system of claim 1, wherein the one or more processors are further configured to:
   select the first set of test parameters by applying the Bayesian optimization function based on a target metric and an uncertainty estimate associated with the target metric.

6. The system of claim 5, wherein the one or more processors are further configured to:
   determine the target metric based on at least one of a readout fidelity, a qubit frequency drift, a flux position, a qubit decoherence time, or a gate fidelity.

7. The system of claim 1, wherein the one or more processors are further configured to:
   execute the one or more calibration experiments by varying a control parameter of the first set of test parameters for a plurality of experiment runs.

8. The system of claim 1, wherein the one or more processors are further configured to:
   generate the second set of operational parameters by updating at least one of a flux bias, a drive amplitude, a coupler bias, or a readout resonator frequency according to the set of calibration results.

9. The system of claim 1, wherein the one or more processors are further configured to:
   obtain second telemetry data from the quantum processor during operation using the second set of operational parameters; and update the spatio-temporal graph data structure based on the second telemetry data.

10. The system of claim 1, wherein the one or more processors are further configured to:

control the quantum processor according to the second set of operational parameters by adjusting one or more hardware control signals associated with one or more control lines of the quantum computing system.

11. A method, comprising:

obtaining, by one or more processors coupled to non-transitory memory, telemetry data from a quantum processor of a quantum computing system, the telemetry corresponding to a first set of operational parameters;

generating, by the one or more processors, a spatio-temporal graph data structure based on the telemetry data and the first set of operational parameters, wherein a set of nodes of the spatio-temporal graph data structure correspond to a set of qubits of the quantum processor, the spatio-temporal graph data structure comprising (i) a first set of edges corresponding to spatial relationships between the set of qubits, and (ii) a second set of edges corresponding to temporal relationships between the set of nodes;

providing, by the one or more processors, at least a portion of the spatio-temporal graph data structure as input to a graph neural network (GNN) to generate a set of parameter ranges for operation of the quantum processor;

selecting, by the one or more processors, based on the set of parameter ranges, a first set of test parameters for the quantum computing system using a Bayesian optimization function;

executing, by the one or more processors, one or more calibration experiments using the first set of test parameters to generate a set of calibration results;

generating, by the one or more processors, a second set of operational parameters for the quantum computing system based on the set of calibration results; and controlling, by the one or more processors, the quantum processor according to the second set of operational parameters.

12. The method of claim 11, wherein the spatio-temporal graph comprises at least one edge corresponding to a relationship between two of the set of nodes.

13. The method of claim 11, wherein the telemetry data comprises at least one of a qubit frequency, an anharmonicity value, a readout fidelity value, a gate error rate value, a flux bias value, a drive amplitude value, a qubit type, a qubit fabrication parameter, a coupling strength value, an inter-qubit distance value, a crosstalk coefficient, a two-qubit gate fidelity value, a resonance frequency, or a coupling tunability value.

14. The method of claim 11, further comprising generating, by the one or more processors, the spatio-temporal graph by creating temporal edges connecting nodes corresponding to the same qubit at different time indices.

15. The method of claim 11, further comprising selecting, by the one or more processors, the first set of test parameters by applying the Bayesian optimization function based on a target metric and an uncertainty estimate associated with the target metric.

16. The method of claim 15, further comprising determining, by the one or more processors, the target metric based on at least one of a readout fidelity, a qubit frequency drift, a flux position, a qubit decoherence time, or a gate fidelity.

17. The method of claim 11, further comprising executing, by the one or more processors, the one or more calibration experiments by varying a control parameter of the first set of test parameters for a plurality of experiment runs.

18. The method of claim 11, further comprising generating, by the one or more processors, the second set of operational parameters by updating at least one of a flux bias, a drive amplitude, a coupler bias, or a readout resonator frequency according to the set of calibration results.

19. The method of claim 11, further comprising obtaining, by the one or more processors, second telemetry data from the quantum processor during operation using the second set of operational parameters, and updating, by the one or more processors, the spatio-temporal graph data structure based on the second telemetry data.

20. A non-transitory computer-readable medium storing instructions that, when executed by one or more processors coupled to non-transitory memory, cause the one or more processors to perform operations comprising:

obtaining telemetry data from a quantum processor of a quantum computing system, the telemetry corresponding to a first set of operational parameters;

generating a spatio-temporal graph data structure based on the telemetry data and the first set of operational parameters, wherein a set of nodes of the spatio-temporal graph data structure correspond to a set of qubits of the quantum processor, the spatio-temporal graph data structure comprising (i) a first set of edges corresponding to spatial relationships between the set of qubits, and (ii) a second set of edges corresponding to temporal relationships between the set of nodes;

providing at least a portion of the spatio-temporal graph data structure as input to a graph neural network (GNN) to generate a set of parameter ranges for operation of the quantum processor;

selecting, based on the set of parameter ranges, a first set of test parameters for the quantum computing system using a Bayesian optimization function;

executing one or more calibration experiments using the first set of test parameters to generate a set of calibration results;

generating a second set of operational parameters for the quantum computing system based on the set of calibration results; and controlling the quantum processor according to the second set of operational parameters;

obtaining second telemetry data from the quantum processor during operation using the second set of operational parameters; and updating the spatio-temporal graph data structure based on the second telemetry data.

\* \* \* \* \*